United States Patent
VerSteeg et al.

(10) Patent No.: US 9,948,561 B2
(45) Date of Patent: Apr. 17, 2018

(54) SETTING DELAY PRECEDENCE ON QUEUES BEFORE A BOTTLENECK LINK BASED ON FLOW CHARACTERISTICS

(71) Applicant: CISCO TECHNOLOGY, INC., San Jose, CA (US)

(72) Inventors: William C. VerSteeg, New Smyrna Beach, FL (US); Michael A. Ramalho, Lakewood Ranch, FL (US)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 14/686,575

(22) Filed: Apr. 14, 2015

(65) Prior Publication Data

US 2016/0308769 A1    Oct. 20, 2016

(51) Int. Cl.
| | |
|---|---|
| H04L 12/801 | (2013.01) |
| H04L 12/873 | (2013.01) |
| H04L 12/927 | (2013.01) |
| H04L 12/26  | (2006.01) |

(52) U.S. Cl.
CPC .......... *H04L 47/12* (2013.01); *H04L 43/0852* (2013.01); *H04L 43/0894* (2013.01); *H04L 47/522* (2013.01); *H04L 47/801* (2013.01)

(58) Field of Classification Search
CPC ...................................................... H04L 47/12
See application file for complete search history.

(56) References Cited

U.S. PATENT DOCUMENTS

| | | | | |
|---|---|---|---|---|
| 6,094,435 A | * | 7/2000 | Hoffman | H04L 12/5693 370/414 |
| 6,822,940 B1 | * | 11/2004 | Zavalkovsky | H04L 47/10 370/235 |
| 7,139,281 B1 | * | 11/2006 | Bodin | H04L 47/10 370/252 |
| 7,496,064 B2 | * | 2/2009 | Kupershmidt | H04L 1/0041 370/321 |

(Continued)

OTHER PUBLICATIONS

"Chapter 37: Configuring Quality of Service," Software Configuration Guide—Release 12.2(52)SG, Cisco Systems, Inc., Published on or about May 5, 2015 http://www.cisco.com/c/en/us/td/docs/switches/lan/catalyst4500/12-2/52sg/configuration/guide/config/qos.pdf.

(Continued)

*Primary Examiner* — Jason Mattis

(57) ABSTRACT

Embodiments include detecting an increase in delay of a flow assigned to a first queue of a network device, where the increase is sufficient to cause the flow rate of the flow to decrease if the flow is delay-sensitive. Embodiments further include determining whether an amount of bandwidth consumed by the flow decreases sufficiently after the increase is detected, and assigning the flow to a second queue based, at least in part, on determining the amount of bandwidth consumed by the flow does not decrease sufficiently. Specific embodiments include evaluating a series of two or more bandwidth measurements of the flow according to a bandwidth reduction measure to determine whether the amount of bandwidth consumed by the flow decreases by sufficiently. More specific embodiments include the first queue being configured to receive delay-sensitive flows and the second queue being configured to receive delay-insensitive nice flows.

20 Claims, 11 Drawing Sheets

(56) References Cited

U.S. PATENT DOCUMENTS

| | | | | |
|---|---|---|---|---|
| 2002/0161914 | A1* | 10/2002 | Belenki | H04L 12/5693 709/235 |
| 2006/0039287 | A1* | 2/2006 | Hasegawa | H04L 69/163 370/238 |
| 2007/0038752 | A1 | 2/2007 | Jorgensen | |
| 2008/0192636 | A1* | 8/2008 | Briscoe | H04L 47/10 370/236 |
| 2011/0267175 | A1 | 11/2011 | Moshfeghi | |
| 2012/0281535 | A1 | 11/2012 | Day | |
| 2014/0164602 | A1* | 6/2014 | Bugenhagen | H04L 43/10 709/224 |
| 2015/0023169 | A1* | 1/2015 | Wu | H04L 47/6215 370/235 |

OTHER PUBLICATIONS

"Chapter 2: Campus QoS Design," Enterprise QoS Solution Reference Network Design Guide, Version 3.3, Cisco Systems, Inc., Nov. 2005 http://www.cisco.com/en/US/docs/solutions/Enterprise/WAN_and_MAN/QoS_SRND/QoSDesign.html#wp999958.

"Quality of Service on Cisco Catalyst 4500 Series Supervisor Engines," Cisco Systems White Paper, published on or about Feb. 14, 2014, 23 pages http://www.cisco.com/c/en/us/products/collateral/switches/catalyst-4500-series-switches/prod_white_paper0900aecd8041691c.html.

"Quality of Service on the Cisco Catalyst 4500E Supervisor Engines," Cisco Systems White Paper, Jun. 2013, 19 pages http://www.cisco.com/c/en/us/products/collateral/switches/catalyst-4500-series-switches/white_paper_c11-539588.html.

Ertemalp, Fusun, et al., "Using Dynamic Buffer Limiting to Protect Against Belligerent Flows in High-Speed Networks," ICNP 2001 International Conference on Network Protocols, Riverside, California, Nov. 11-Nov. 14, 2001, 11 pages http://www.ieee-icnp.org/2001/papers/2001-25.pdf.

Hartmann, Dennis, "Virtualization Jungle, Switch QoS 4500 Platform," Network World, Jun. 23, 2009; 2 pages. http://www.networkworld.com/article/2236211/cisco-subnet/switch-qos.html.

Law, Will, "Double Double Toil and Trouble Bandwidth Grows and Congestion Bubbles," Akamai, Packet Video Workshop, San Jose CA, Dec. 2013.

Nichols, Kathleen, et al., "acmqueue Controlling Queue Delay," Networks, © 2012 ACM 1542-7730/12/0400, May 1, 2012, 15 pages.

Pan, R., et al., "PIE: A Lightweight Control Scheme to Address the Bufferbloat Problem," Internet Draft Network Working Group, draft-pan-aqm-pie-00, Jun. 3, 2013, 13 pages.

* cited by examiner

SETTING DELAY PRECEDENCE ON QUEUES BEFORE A BOTTLENECK LINK BASED ON FLOW CHARACTERISTICS

TECHNICAL FIELD

This disclosure relates in general to the field of computer networks and, in particular, to setting delay precedence on queues before a bottleneck link based on flow characteristics.

BACKGROUND

A best-effort (BE) delivery service describes a network service or link that does not guarantee data is delivered. Instead, a best-effort service is provided in which rate and delivery time of a flow depends, at least in part, on current traffic load. In a network environment using best-effort delivery service, such as Internet Protocol (IP), network elements typically maintain queues for receiving and temporarily storing packets of flows traversing the network.

Network congestion occurs when the offered load to a node or link in a network exceeds the node or link's capacity. When this occurs, the Quality of Service (QoS) of flows traversing such a congested node or link may be adversely affected. Common effects of network congestion can include queuing delay and/or packet loss. For example, buffer management algorithms may be used to drop a packet in response to a queue overflowing. When a packet is dropped from a particular flow in a queue, a source node of the flow may be notified so that the protocol associated with the flow can reduce the offered load of the flow. Queuing delay is another effect of network congestion and refers to the time a packet waits in a queue until it can be transmitted. As a queue begins to grow due to network traffic arriving faster than it can be processed, the amount of delay experienced by packets in the queue increases. When increasing delay is detected in a flow, a source node of the flow may detect the delay based on various types of delay signals.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

A method is provided in one example of the present disclosure and includes detecting an increase in delay of a flow assigned to a first queue of a network device, where the increase is sufficient to cause the flow rate of the flow to decrease if the flow is delay-sensitive. The method also includes determining whether an amount of bandwidth consumed by the flow decreases sufficiently after the increase is detected, and assigning the flow to a second queue based, at least in part, on determining the amount of bandwidth consumed by the flow does not decrease sufficiently.

In specific embodiments, the method includes evaluating a series of two or more bandwidth measurements of the flow according to a bandwidth reduction measure to determine whether the amount of bandwidth consumed by the flow decreases sufficiently. The two or more bandwidth measurements can represent amounts of bandwidth consumed by the flow in the network device over sequential time periods. In further embodiments, the method includes determining respective delay periods for two or more packets of the flow received by the network device, and evaluating the respective delay periods based, at least in part, on a delay increase measure to determine whether the increase is sufficient to cause the flow rate to decrease if the flow is delay-sensitive. The method may further include determining a delay period for a particular packet of the two or more packets received by the network device, where the delay period is calculated based on a time difference between an egress time of the particular packet at the network device and a timestamp from a source node in the particular packet.

These and other embodiments can optionally include one or more of the following features. The assigning the flow to the second queue can cause subsequent packets of the flow to be stored in the second queue. The flow can comprise a set of flows having a same classification. The second queue can be configured to receive delay-insensitive nice flows. The first queue can be configured to receive delay-sensitive flows. The subsequent packets of the flow may not be stored in the second queue until after a propagation delay period of the flow expires, where a timer for the propagation delay period begins when the increase is determined to be sufficient to cause the flow rate of the flow to decrease if the flow is delay-sensitive.

Some or all of the features may be included in respective systems or other apparatuses and devices for performing the described functionality. Furthermore, some or all of the features may be implemented in at least one machine readable storage medium.

DESCRIPTION OF EMBODIMENTS

Figure 1:
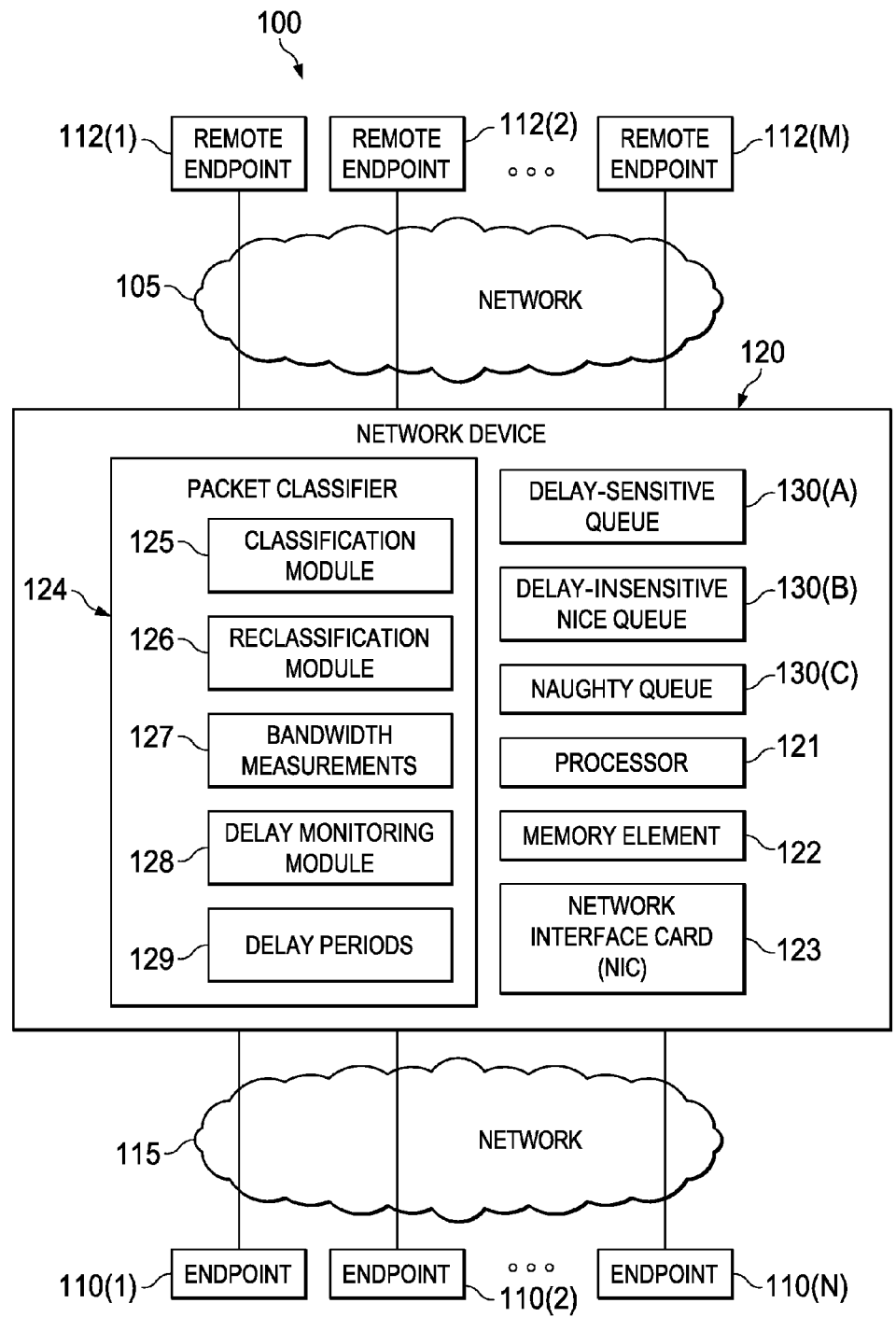
FIG. 1 is a simplified block diagram of a communication system according to at least one embodiment.

FIG. 1 is a simplified block diagram of an example communication system 100 for setting delay precedence on queues before a bottleneck link based on flow characteristics. Communication system 100 comprises a network device 120 interconnected to one or more endpoints 110(1), 110(2), through 110(N) by any suitable forms of electronic communication. In general, endpoints 110(1)-110(N) can include any type of termination point in a network connection capable of sending and receiving network communications. Network device 120 may facilitate network communications between endpoints 110(1)-110(N) via a network 115. Network device 120 can include a processor 121, a memory element 122, and a network interface card (NIC) 123. In at least one embodiment, network device 120 may also comprise a packet classifier 124, which includes a classification module 125, a reclassification module 126, and a delay monitoring module 128. Packet classifier 124 may also include a memory element of some type for bandwidth measurements 127 and delay periods 129. Network device 120 also includes two or more queues, such as delay-sensitive queue 130(A), delay-insensitive nice queue 130 (B), and naughty queue 130(C). Network device 120 may be configured for communication with a network 105, which enables network communication between endpoints 110(1)- 110(N) and remote endpoints 112(1)-112(M) (e.g., destination nodes). In one example, network 115 represents a local area network and network 105 represents a wide area network such as the Internet.

Elements of FIG. 1 may be coupled to one another through one or more interfaces employing any suitable connections (wired or wireless), which provide viable pathways for network communications. Additionally, one or more of these elements of FIG. 1 may be combined or removed from the architecture based on particular configuration needs. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP), any other suitable protocol, or any suitable combination thereof where appropriate and based on particular needs.

For purposes of illustrating the techniques of communication system 100, it is important to understand the activities that may be present in the networks. The following foundational information may be viewed as a basis from which the present disclosure may be properly explained. Such information is offered for purposes of explanation only and, accordingly, should not be construed in any way to limit the broad scope of the present disclosure and its potential applications.

Network devices, such as a middlebox or router, are typically deployed at various points in a network, but are often found at network edges to provide an entry and/or exit point into a particular network (e.g., enterprise, service provider, campus, etc.). A middlebox can include a network appliance or other network element that inspects, filters, or otherwise manipulates network traffic, in addition to forwarding or routing the network traffic toward its destination. Generally, network devices maintain one or more queues to temporarily store packets of network flows, which can originate from a source node, such as endpoints 110(1)-110 (N) or remote endpoints 112(1)-112(M). A queue in the network device typically stores packets from multiple flows assigned to the queue. The flows that share a queue compete for bandwidth and thus, for buffer space in the queue.

In general, different applications desire differentiated network transport, and the flows created by these applications are said to have different Quality of Service (QoS) needs. In a common example, a network device may have several queues with each queue designated for different types of network traffic as configured by a network operator or network administrator. In one example, a network device may include a queue for its voice traffic, a queue for its video traffic, and a Best Effort (BE) queue for all other traffic. 'Over-the-top' applications such as third-party video streaming (e.g., Netflix) can generate flows that are delivered with no special QoS handling and thus, the flows from these applications are often placed in the BE queue. Over-the-top content generally refers to audio, video, and other media delivered over the Internet without a multi-system operator (MSO) involved in the control or distribution of the content. The behavior of certain flows in a set of flows, associated with a Quality of Service (QoS) classification that is better than Best Effort, can affect the flows in the BE queue. Additionally, certain flows in other queues, such as designated video or voice traffic queues, can affect the other flows in those queues as well.

Network congestion can occur when a link or node, such as a middlebox, has excessive load offered to it, which results in the deterioration of the QoS of the flows progressing through the link or node. The node or link where congestion occurs can be located anywhere along the transmission path taken by a flow between a source node and a destination node. A common effect of network congestion is packet loss. Modern buffer management algorithms are designed to drop or mark packets in a manner that does not allow a standing queue and consequently, minimizes bufferbloat. For example, buffer management algorithms may be used to drop a packet in response to a queue overflowing, or mark a packet to indicate impending congestion. When a middlebox drops or marks a packet, a sender of the flow may be notified and the protocol that is driving the flow that experiences the drop/mark is supposed to reduce its offered load.

Queuing delay is another effect of network congestion and refers to the time a packet waits in a queue of a link until it can be transmitted. As a queue begins to grow due to network traffic arriving faster than it can be processed or forwarded, the amount of delay experienced by a packet in the queue increases. Thus, the transit time for a packet to traverse a node experiencing queuing delay or to traverse any segment of a path with a bottleneck link can increase. Consequently, the round trip time (RTT) of a flow, as well as any segment of the path that includes the link, may also experience increased delay.

Typically, transport protocols or applications are designed to respond to packet loss or increasing delay at a congested network device by slowing down network traffic being sent through it. Delay-based congestion control protocols are becoming increasingly more common and important in networking. A delay-sensitive, real-time, responsive transport or application (e.g., Low Extra Delay Background Transport (LEDBAT), Skype, RTP Media Congestion Avoidance Techniques (RMCAT) currently being defined by the Internet Engineering Task Force (IETF) RMCAT Working Group, etc.) rate adapts based on congestion measures such as delay, and generally does not tolerate long queuing delays such as those needed by Transmission Control Protocol (TCP) for best TCP throughput/utilization. More specifically, a delay-sensitive flow in the presence of other homogeneous delay-sensitive flows, is supposed to rate adapt (i.e., share bandwidth) based on delay variation without packet loss.

A delay-insensitive, non real-time transport (e.g., TCP) or application does not detect congestion until packet loss occurs, or until an Explicit Congestion Notification (ECN) occurs for ECN capable flows. For a non-ECN capable long-lived TCP flow (e.g., File Transfer Protocol (FTP)), congestion is not detected until a queue overflows and causes packet loss from the flow. Consequently, when a long-lived TCP flow experiences delay without overflowing queues, the offered load may not be decreased. However, when an endpoint using TCP notices a flow has experienced packet loss, the bandwidth of the TCP flow may be halved and then slowly increased until packet loss is detected again. This type of flow that only responds to packet loss by rate adapting downward, is referred to herein as 'delay-insensitive nice'. Typically, a queue associated with a bottleneck link is configured to have a maximum delay on the order of the round trip time (RTT) of the flows going through it, as this yields the best throughput/utilization of TCP flows.

Although most protocols or applications are well-behaved and designed to respond to one or more types of congestion notifications (e.g., delay, packet loss, ECN notification, etc.), some outliers are not well-behaved and do not respond to packet loss or delay, or do not respond with sufficient bandwidth reduction. The term 'bandwidth' as used herein, generally refers to the amount of data that can pass over a transmission medium from one point to another in a network. The not well-behaved flows tend to build standing queues, while the well-behaved flows tend not to build standing queues. An application or protocol of a flow may respond to changes in delay (or other congestion results such as packet loss or ECN notifications) by rate adaptation. Rate adaptation is the process by which a flow rate (i.e., a data transmission rate) of a flow is adjusted upward or downward. When a flow rate adapts downward based on congestion, the flow rate is reduced and thus, bandwidth consumption by the flow is reduced.

Congestion unresponsive flows are flows of protocols that do not rate adapt downward (i.e., reduce their bandwidth consumption) or that do not reduce it enough after detecting congestion are referred to herein as 'misbehaving' or 'naughty' flows. Congestion responsive flows are flows of protocols that do rate adapt downward in response to congestion notifications and are referred to herein as 'behaving' or 'nice' flows. References herein to 'delay-insensitive flow' can be inclusive of naughty flows that do not rate adapt to either delay signals or packet loss, and/or to nice flows that do not rate adapt to delay signals but do rate adapt to packet loss. References herein to 'delay-insensitive nice flows' can refer to nice flows that do not rate adapt to delay signals but do rate adapt to packet loss. References herein to 'delay-sensitive flows' are inclusive of nice flows that rate adapt to delay signals.

Examples of flows that tend to build standing queues include any large TCP transfer that does not use a delay-sensitive TCP application such as HyperText Transfer Protocol Live Streaming (HLS), Moving Pictures Expert Group Dynamic Adaptive Streaming over HTTP (MPEG DASH), Microsoft Multi Media Server streaming (MSFT Streaming), progressive video download, etc. Although the problems caused by these flows can be alleviated using a variety of methods, including a delay-sensitive TCP stack, rate control at the client, rate control at the server, advanced buffer management algorithms, etc., outlier flows that build a standing queue can still occur. Accordingly, it would be advantageous if flows that build standing queues only impacted other flows that also build standing queues, and did not impact flows that do not build standing queues.

When these naughty flows are combined in the same queue with flows that do respond to congestion notifications (either packet loss or delay), once congestion occurs, the naughty flow may continue to grow and increase its bandwidth consumption while the other flows tend to shrink as they decrease their bandwidth consumption. Moreover, the queue may continue to grow until it overflows. Thus, misbehaving flows are rewarded with increased bandwidth while behaving flows are penalized with reduced bandwidth. Nice flows are, in effect, stuck behind naughty flows, and this scenario creates little incentive for a protocol to be nice.

Dynamic buffer limiting (DBL) has been used to address non-adaptive flows (or naughty flows) that do not respond to packet loss. DBL tracks queue length for traffic flows in a switch, and recognizes when a flow is unresponsive to packet drops. When a queue length of a particular flow exceeds its computed limit, DBL drops packets or marks the Explicit Congestion Notification (ECN) field in the packet headers. If the flow does not respond to the packet drop or ECN notification and continues to send packets at the same high rate, then the flow may be identified as an aggressive non-adaptive flow, and its buffer usage may be reduced.

Combining delay-sensitive flows with delay-insensitive nice flows and/or naughty flows in the same queue can potentially cause bufferbloat, which can be detrimental to the delay-sensitive flows. The combination can effectively penalize the delay-sensitive flows, such as media traffic, while simultaneously rewarding the other flows. The queue may continue growing even while delay is increasing, until there is no more room and a packet is dropped, or until there is impending congestion and an ECN notification is sent. Delay-sensitive flows (also referred to herein as 'delay adaptive flows') are nice flows that modulate their offered load to avoid the queue overflowing and consequent packet losses. The delay-insensitive flow, however, will continue to fill the queue faster and faster as the delay-sensitive flows continue to slow down. Thus, even 'nice' delay-insensitive flows (e.g., a TCP flow that responds to packet losses but not to delay) effectively penalizes a delay-sensitive flow in the same queue, and can diminish its delay performance as network congestion continues or increases.

Additionally, with the advent of rate adaptive video, including both real-time rate adaptive video and Adjustable Bit Rate (ABR)/streaming video, many applications are likely to use adaptive rate processing to take advantage of otherwise unused bandwidth. Until a particular application has widespread adoption, there is little motivation for an individual application to be less aggressive, because its experience suffers relative to other more aggressive flows. Thus, naughty adaptation behavior is becoming increasingly more prevalent. Consequently, mechanisms to protect low-delay nice services as they compete with such naughty flows are needed.

In accordance with at least one embodiment of the present disclosure, the aforementioned issues associated with network congestion and in particular, with increasing delays, can be resolved in communication system 100. In communication system 100, flows responding appropriately to congestion signals are rewarded, while a subset of these well behaving flows that require low-delay is concurrently provided with low-delay transit. More specifically, a network device, such as a middlebox or router, can set delay precedence and identify and segregate delay-insensitive flows (both nice and naughty) from delay-sensitive flows to minimize standing queues or bufferbloat, queue overflows, and packet losses, which could unfairly affect the flows adapting their loads based on delay. Multiple queues can be provided in the network device, according to a desired number of metrics to differentiate between the flows. In at least one embodiment, three queues can be provided to temporarily store delay-sensitive flows, delay-insensitive nice flows, and naughty flows, respectively. The network device can be configured to identify and segregate the flows according to the classified queues. Segregation can occur by promotion and/or demotion of various flows within the queues. A flow can be reclassified when its behavior indicates reclassification is warranted, and reassigned to the appropriate queue associated with the flow's new classification. For example, a flow may be demoted from a delay-sensitive queue to a delay-insensitive nice queue when the flow is determined to not adapt to delay signals. A flow may be demoted from a delay-insensitive nice queue to a naughty queue when the flow is determined not to adapt to packet loss. A flow may be promoted from a delay-insensitive nice queue to a delay-sensitive queue when the flow is determined to adapt to delay signals. Also, a flow may be promoted from a naughty queue to a delay-insensitive nice queue or a delay-sensitive queue when the flow is determined to adapt to packet loss and/or delay signals. Finally, the network device may allow flows to initially assert a queue classification, and promote or demote the flow as needed.

Several advantages can be achieved by segregating flows into various queues according to behavior gleaned during periods of network congestion, and in particular, when delay of a flow increases. Embodiments disclosed herein can classify bloaty and non-bloaty flows, thus allowing a middlebox (or other network device) to differentiate between them. Queues associated with delay-sensitive flows can be separated from queues associated with delay-insensitive nice flows and queues associated with naughty flows, and therefore, the delay-sensitive flows are not impacted by the delay-insensitive nice flows and the naughty flows. Once the queues are appropriately separated, delay-sensitive flows and delay-insensitive nice flows do not experience cross-traffic delay, but naughty flows do experience cross traffic delay. Furthermore, the delay-insensitive nice flows impact only other delay-insensitive nice flows, and naughty flows impact only other naughty flows. Consequently, communication system 100 provides a strong incentive to avoid deploying protocols that do not respond to congestion signals, but instead, to design and deploy protocols that do respond to congestion signals, such as delay or packet loss based on the objectives and/or needs of the particular protocol.

Turning to the infrastructure of FIG. 1, FIG. 1 is a simplified block diagram of communication system 100 comprising network device 120, endpoints 110(1)-110(N), and remote endpoints 112(1)-112(M) interconnected in a network environment. Networks 105 and 115 represent a series of points or nodes of interconnected communication paths for receiving and transmitting packets of information that propagate through communication system 100. Networks 105 and 115 offer a communicative interface between nodes (e.g., endpoints 110(1)-110(N), network device 120, remote endpoints 112(1)-112(M), etc.), and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in a network environment.

In networks 105 and 115, network traffic, which is inclusive of packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., endpoint 110(1)) and a destination node (e.g., endpoint 112(1), endpoint 110(2)) in networks 105 and 115. A packet includes, but is not limited to, a source network address, a destination network address, and a payload containing the information to be communicated. A packet may also include a timestamp from the source node. By way of example, these network addresses can be Internet Protocol (IP) addresses in a TCP/IP messaging protocol.

Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks. As used herein, a 'network flow' or 'flow' is a sequence of packets designated as a flow by a source node. In one example, a flow can include all packets in a particular media stream.

Endpoints 110(1)-110(N) can be associated with initiating communication (e.g., traffic flows) in communication system 100 via some network. The term 'endpoint' is inclusive of devices used to initiate a communication, such as a computer, set-top box, IRD, telephone, client, server, VoIP phone, video phone, laptop, desktop computer, personal computer, mobile device, source node, destination node, or any other computing device, component, element, or object capable of initiating voice, audio, video, media, or data exchanges within communication system 100. Endpoints 110(1)-110(N) may also be inclusive of a suitable interface to a human user, such as a display, a keyboard, a touchpad, a remote control, or other terminal equipment. Endpoints 110(1)-110(N) may also be any device that seeks to initiate a communication on behalf of another entity or element, such as a program, a database, or any other component, device, element, or object capable of communication within communication system 100.

Network device 120 is a network element that facilitates network communications between other nodes (e.g., source node and destination node) in one or more networks (e.g., network 105, network 115). As used herein, the term 'network element' is meant to encompass middleboxes, routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, network device 120 includes software to achieve (or to foster) setting delay precedence on multiple queues based on flow characteristics, as outlined herein. Note that in one example, network device 120 can have an internal structure (e.g., processor 121, memory element 122, NIC 123, etc.) to facilitate some of the operations described herein. In other embodiments, these delay precedence setting activities may be executed externally to network device 120, or included in some other network element to achieve this intended functionality. Alternatively, network device 120 may include this software (or reciprocating software) that can coordinate with other network elements in order to achieve the operations, as outlined herein. In still other embodiments, one or several devices may include any suitable algorithms, hardware, software, firmware, components, modules, interfaces, or objects that facilitate the operations thereof. Furthermore, in any given communication system 100, one or more network devices, such as network device 120, may deployed at network edges, in the core of a network, or at any other location according to particular needs.

Generally, it can be advantageous to implement network device 120 at points in a network where bottlenecks occur, or are likely to occur. In at least one example, network device 120 can be implemented as an edge device that provides an entry and/or exit point into a particular network (e.g., enterprise, service provider, campus, etc.). Implementing network device 120 as an edge device may be desirable because congestion often occurs at edge devices and typically, maximum utilization is less important at the edge of a network than within the network core. In addition, some organizations have networks with links positioned between physical locations of the organization. These links may be prone to bottlenecks and it may be advantageous to implement network device 120 at such links. Although network device 120 may be commonly implemented as an edge device (e.g., for enterprise or service provider core networks, between geographically dispersed locations of enterprise or service provider networks, etc.), it will be apparent that network device 120 could be implemented at any point within a network (e.g., within the core network, etc.) based on particular needs, and these examples are not intended to limit the broad scope of the embodiments described herein. For example, in some implementations, network 115 may be configured such that network traffic between any two endpoints 110(1)-110(N) passes through network device 120.

In operational terms, network device 120 can segregate network traffic into a sub-queue or a set of sub-queues on a per QoS bucket basis. These sub-queues could be designed such that cooperative flows compete with other cooperative flows in a sub-queue, and aggressive/misbehaving flows compete with other similar traffic. In particular, flows that rate adapt in response to packet loss or ECN notification congestion signals can be segregated from flows that rate adapt to delay signals. In this system, for example, if an application or protocol tends to respond to congestion signals (e.g., delay, packet loss, ECN notification), then its flows can be assigned to a sub-queue with good delay characteristics and can consume a fair share of bandwidth. Further segregation can be applied to flows from applications or protocols that respond to congestion signals that indicate increasing delay in the flows. Congestion signals that indicate a change in the delay of a flow, which should be acted upon by an endpoint to change the rate of the flow, are referred to herein as 'delay signals'. The flow can be assigned to a sub-queue in which the flow does not have to compete with other flows that do not rate adapt based on delay (e.g., flows that only adapt to packet loss or ECN notifications). If an application or protocol does not tend to respond to any congestion signals, then its flow can share a sub-queue with poor delay characteristics and the network can bias the bandwidth towards the behaving queues.

The sub-queues configured in network device 120, which enable segregation of flows based on delay and other congestion signals, are not limited to a particular number. Flows are mapped to X sub-queues (where X=some positive number) based on the responses of the flows to congestion signals. The number of sub-queues configured in network device 120 for a particular type of queue (e.g., Best Effort queue where unclassified flows from over-the-top applications are sent) may be based on the granularity desired and the particular needs of the network. In at least one embodiment, X=3 such that network device 120 segregates network traffic into the following three sub-queues: delay-sensitive queue 130(A), delay-insensitive nice queue 130(B), and naughty queue 130(C). Additional sub-queues could be configured based on a desired level of granularity. In one example, sub-queues could be configured to accommodate flows based on how often those flows misbehave. For ease of illustration, however, embodiments will be described herein with reference to 3 sub-queues, delay-sensitive queue 130(A), delay-insensitive nice queue 130(B), and naughty queue 130(C), and references to 'queues' herein are intended to include 'sub-queues'.

Network device 120 may be implemented before a bottleneck link in a network, and its queues may be configured to admit nice flows into the bottleneck and to discourage naughty flows by penalizing them relative to nice flows. In one example, delay-sensitive queue 130(A) is configured to receive delay-sensitive flows that rate adapt based on delay signals, delay-insensitive nice queue 130(B) is configured to receive TCP flows that rate adapt based on packet losses or ECN notifications but not delay signals, and naughty queue 130(C) is configured to receive flows that do not rate adapt based on congestion signals (packet losses, ECN, or delay). Naughty queue 130(C) may receive flows that are serviced only when excess bandwidth is available, or as scavenger flows at a low percentage of link bandwidth (e.g., 10%).

By way of illustration, an example length of the queues is specified herein in time and is calculated as if all the bits in the queue are serviced at a bottleneck link rate. If the bottleneck rate is R bits per second, and R=1,000,000, then a 250 ms queue is:

$$(R \text{ bits/sec}) * (1/8 \text{ byte/bit}) * (1/1000 \text{ sec/ms}) * (250 \text{ ms}) =$$
$$(1,000,000 \text{ bits/sec}) * (1/8 \text{ byte/bit}) * (250/1000 \text{ sec}) = 31,250 \text{ bytes long}$$

In one example implementation, network device 120 may be configured with delay-sensitive queue 130(A) being no longer than 100 milliseconds (ms), delay-insensitive nice queue 130(B) being 200 ms, and naughty queue 130(C) being 300 ms. For a class-based weighted fair queuing (CBWFQ) implementation, which supports user-defined traffic classes, delay-sensitive queue 130(A) may be guaranteed to have access to 60% of the link bandwidth, delay-insensitive nice queue 130(B) may be guaranteed to have access to 30% of the link bandwidth, and naughty queue 130(C) may guaranteed to have access to 10% of the link bandwidth. At any given time, each of the queues may have access up to 100% of bandwidth if there are no flows currently assigned to the other queues. The target traffic for delay-sensitive queue 130(A) includes traffic that responds to delay congestion signals or a flow that has a very small instantaneous bandwidth (e.g., less than 5% of the network device bandwidth). The target traffic for delay-insensitive nice queue 130(B) includes traffic that requires queue overflow (or an ECN notification) as its congestion signal. For example, 'TCP optimized' flows may be assigned to this queue. The target traffic for naughty queue 130(C) includes traffic of significant bandwidth that is unresponsive to any congestion signal.

Packet classifier 124 of network device 120 may be configured to assign flows traversing network device 120 to appropriate queues (e.g., queues 130(A)-130(C)). Assigning flows to the appropriate queues can include an initial classification of a flow by classification module 125, and subsequent reclassification of the flow by reclassification module 126 if needed. The initial classification can be made based on a predetermined default classification, a predetermined known classification, known signaling, metadata information, inferences derived from the way a packet is encapsulated (e.g., real-time audio or video flows), or any other technique that provides an indication of the flow behavior. Generally, the system can be flow-aware in order to perform classifications.

Predetermined default classification may be used for any or all flows that are unclassified (i.e., not otherwise classified according to some other criteria). In at least one embodiment, a default classification can be a delay-insensitive nice, which can be associated with a queue (e.g., TCP queue) that is allocated more than the minimal bandwidth of a naughty queue for misbehaving flows, but less than the significant bandwidth of a delay-sensitive queue for delay adaptive flows. A flow assigned to a delay-insensitive nice queue can remain in that queue until its behavior reveals, during periods of congestion, that it should be reclassified up (promoted) or down (demoted). The objective can be for really nice delay-adaptive flows to be promoted to a delay-sensitive queue, and unresponsive bad flows to be demoted to a naughty queue.

A predetermined known classification may be used initially for some flows. For example, a system controller could have a pre-configured list of 'naughty' protocols. Deep packet inspection (DPI) could be used, where the data and possibly the header of a packet is examined in real-time to identify a flow from a protocol known to be naughty, for example. However, encryption may make this particular classification technique more difficult.

Classification module 125 may also be configured to accept a flow's assertion of its classification and to assign the flow to a queue corresponding to the asserted classification. Some emerging standards allow for endpoints to send flow metadata, which could be used to assert a flow's classification. Although it is unlikely that a protocol would label its own flow as 'naughty', a flow that asserts itself as 'delay-sensitive' or 'delay-insensitive nice', for example, may be provisionally trusted and classified accordingly. After the initial classification based on the flow's assertion, for example via metadata, the flow could be demoted to a different queue depending on its behavior during periods of congestion. This 'trust-but-verify' approach does not require static parameterization as a flow can be provisionally trusted and then downgraded to an appropriate queue if it subsequently proves its congestion control is untrustworthy. Some flows, however, may assert legitimate classifications and remain in a queue associated with the asserted classification. For example, in an administrative domain where the whole network is within an enterprise, an entity may legitimately assert to a network device that a particular flow is nice and adapts to delay.

In another example, classification module 125 could evaluate trust certificates to classify a flow. Classification module 125 could be configured to accept trust certificates from some certifying authorities who assert a flow as being nice (e.g., delay-sensitive or delay-insensitive nice), and to assign the flow to a queue based on the asserted classification. Classification module 125 could also be configured to reject trust certificates from certain certifying authorities known to 'lie' about flow classification. Flows with these trust certificates may be assigned to another queue not associated with the asserted classification. For example, a flow asserting itself as delay-sensitive, in which its trust certificate is rejected, may be assigned to a delay-insensitive nice queue or even a naughty queue in some instances.

Another approach to classification includes signature analysis, without DPI, either off-line or in-situ. Signature analysis can address queuing problems caused by certain services such as Adaptive Bitrate Streaming (ABR). Applications using ABR (e.g., Netflix) for example, could be characterized off-line. Such an application and its behavior could be studied in a variety of environments and a determination could be made as to whether the service represents itself correctly with metadata. If it is determined that the service (e.g., ABR) does represent (or assert) itself accurately, then its operational characteristics are known, and flows associated with the application could be assigned to the appropriate queue based on the assertion.

Signature analysis of applications could also be performed in-situ. Using ABR again for illustration purposes, applications using ABR services could be characterized in-situ. A TCP flow can be observed to follow a certain burst pattern. The TCP flow may also be observed, during the 'http GET' stages, to be very aggressive and to cause performance degradation of surrounding traffic during the 'on interval'. The classification of the application can be learned and thus, flows associated with the application can be classified appropriately.

After flows have been classified and assigned to appropriate queues, delay in the network may be monitored by an endpoint (e.g., a source node) to determine if and when delay is increasing in a particular flow. A delay-sensitive protocol can be real-time sensitive and need to adapt and share bandwidth in response to delay signals. Delay signals to which an endpoint responds can be provided in one or more of the following ways: 1) at the transport layer by endpoints (e.g., source and destination nodes) sensing the delay, 2) at the transport layer via a bit or other indication in the packets, and 3) at any higher layer such as the application or session layer. First, endpoints of a flow may estimate the queuing delay of the flow, and determine whether the queuing delay is increasing. When endpoints of a flow detect an increase in queuing delay, the endpoints can infer or sense that some queue is congested in the transmission path of the flow. When increased delay in a delay-sensitive flow is inferred, the protocol responds by slowing down its load. Conversely, when endpoints detect a decrease in delay, the endpoints can infer that more bandwidth is available for the flow, and the load may be increased. Second, a network generated delay signal may be configured. Currently, ECN is a protocol used to notify a TCP application of impending congestion for a queue. Similarly, a delay-specific protocol could be configured to automatically notify an application, via the transport layer, that a particular flow is experiencing increasing queuing delay. Finally, explicit signaling of the network could be used to provide a notification to the endpoints that the network is congested. This type of signaling could be above the transport layer, such as the session or application layer.

Delay monitoring module 128 of network device 120 may be configured to monitor the delay of a flow to determine if and when the delay is increasing, such that the flow should respond by rate adapting downward. Any suitable approach that enables detecting an increase in the delay of a flow may be used for monitoring delay by network device 120. In at least one embodiment, delay monitoring module 128 determines whether a detected increase in delay of a particular flow being monitored is sufficient to cause the flow rate of a flow that is delay-sensitive to decrease. When a detected increase in the delay of a monitored flow is not sufficient to cause the flow rate of a delay-sensitive flow to decrease, network device 120 does not expect the monitored flow to rate adapt downward. When a detected increase in the delay of a monitored flow is sufficient to cause the flow rate of a delay-sensitive flow to decrease, network device 120 expects the monitored flow to rate adapt downward if the monitored flow is delay-sensitive. In at least one embodiment, delay monitoring module 128 of network device 120 measures transit times (also referred to herein as 'delay periods') of packets in a monitored flow in order to determine whether the delay is increasing, decreasing, or baseline. This example technique for monitoring delay is further described with reference to FIG. 2.

Reclassification module 126 of network device 120 may be configured to monitor flows traversing network device 120 so that, during periods of network congestion, the behavior of the flows can be evaluated to determine whether one or more need to be reclassified. In at least one embodiment, reclassification module 126 can reclassify flows in order to segregate delay-sensitive flows from other flows that do not rate adapt based on delay, such as delay-insensitive nice flows that rate adapt based on other congestion signals (e.g., packet loss, ECN notifications) and naughty flows that do not rate adapt based on any congestion signals. In particular, flows being reclassified can be promoted or demoted to appropriate queues, as needed. A flow in a delay-sensitive queue can be demoted to another queue (e.g., delay-insensitive nice queue 130(B)) when it is determined that the flow does not respond to delay signals or does not respond quickly enough. A flow that does not respond to delay signals may or may not respond to other congestion signals, such as packet loss signals or ECN notifications. When evaluating flows in a delay-sensitive queue, however, a determination as to whether a particular flow has sufficiently responded to a delay signal is made before the queue overflows.

Detecting whether a flow is adapting or not adapting sufficiently can be performed for each flow or per flow aggregate if two or more flows are classified together. For ease of illustration, detection techniques are further described herein with reference to a single flow. However, it should be understood that the techniques for detecting whether a flow is adapting or not adapting sufficiently could be applied per flow aggregate when multiple flows (i.e., two or more) are classified together. To determine whether a given flow is rate adapting sufficiently to a delay signal, reclassification module 126 can evaluate a series of bandwidth measurements according to a bandwidth reduction measure. Thus, bandwidth consumption can be monitored per flow. In at least one embodiment, the bandwidth measurements can represent amounts of bandwidth consumed by the flow over sequential time periods. In at least one embodiment, the bandwidth reduction measure can indicate an amount of bandwidth reduction as a function of time (e.g., a rate of bandwidth reduction) or any other suitable measure (e.g., any decrease between two sequential bandwidth measurements, a decrease of at least a predetermined amount between two sequential bandwidth measurements, a decrease of at least a predetermined amount over a predetermined time, a decrease over a predetermined number of sequential bandwidth measurements, a decrease from a certain bandwidth that meets or exceeds a predetermined threshold, etc.).

Bandwidth measurements for a given flow may be saved in any appropriate storage (e.g., bandwidth measurements 127) for comparison with other bandwidth measurements of the same flow. Bandwidth measurements 127 can be a cache, a file, a repository, or any other suitable temporary data storage. In at least one embodiment, bandwidth measurements for a given flow may be distinguished from bandwidth measurements for other flows by associating the bandwidth measurements with a 5-tuple (e.g., source IP address/port number, destination IP address/port number, and protocol in use) of the given flow.

Propagation delay may be considered when evaluating a flow's rate adaptation in response to network congestion (e.g., packet loss or increased delay). Generally, a network device does not know a priori whether a flow has a large propagation delay (e.g., amount of time for a flow to travel between endpoints in different continents) or a small propagation delay (e.g., amount of time for a flow to travel between endpoints in the same building). Because flows have propagation delay, generally, the fastest a flow can react to congestion is a round trip time of a packet of the flow. As used herein, 'propagation delay period' for a flow is intended to mean the time in which the flow should have changed its flow rate in response to either packet loss or delay. Typically, a propagation delay period of a flow is on the order of a few or more round trip times RTTs of the flow.

In some implementations, a propagation delay period for a particular 5-tuple flow may be determined by snooping the headers of a packet of the flow to approximate the round trip time (RTT) for the flow. In some cases, the propagation delay period may be computed as a reasonable integer multiple (e.g., 2, 3, 4) of a worse case propagation delay (e.g., ½ second). Furthermore, any other suitable technique may be used to determine or estimate the RTT and associated propagation delay period for the flow.

Propagation delay may be considered when determining whether to promote a flow to delay-sensitive queue 130(A) or delay-insensitive nice queue 130(B) when the behavior of the flow indicates it is responsive to network congestion. For example, after network device 120 detects increasing delay that is sufficient to cause a delay-sensitive flow to rate adapt downward, a flow may not be promoted to delay-sensitive queue 130(A) until a downward rate adaptation by the flow has been detected and a period of time (e.g., propagation delay period) has passed to accommodate the propagation delay of the flow. Allowing this period of time to pass before reclassifying the flow can provide some assurance that the downward rate adaptation was a response by the protocol or application to the increasing delay of the flow. In at least some embodiments, the propagation delay of a flow may also be considered when deciding to demote a flow. When increasing delay is detected in a flow by network device 120, the flow may not be demoted until the propagation delay period of the flow has expired and the flow is still not rate adapting downward fast enough.

By way of example, when a RTT for a flow assigned to a delay-insensitive nice queue is estimated (e.g., by snooping headers of the flow packets), and a loss rate in a TCP flow is known (e.g., by observing sequence numbers on the TCP session or creating an occasional loss for a non-TCP flow pretending to be TCP-friendly), a determination can be made as to whether the flow is behaving within accepted TCP friendly norms. Similarly, rules can be created for acceptable bounds for a variety of flows using other well-known protocols, such as real-time media flows that are delay-sensitive.

Figure 2:
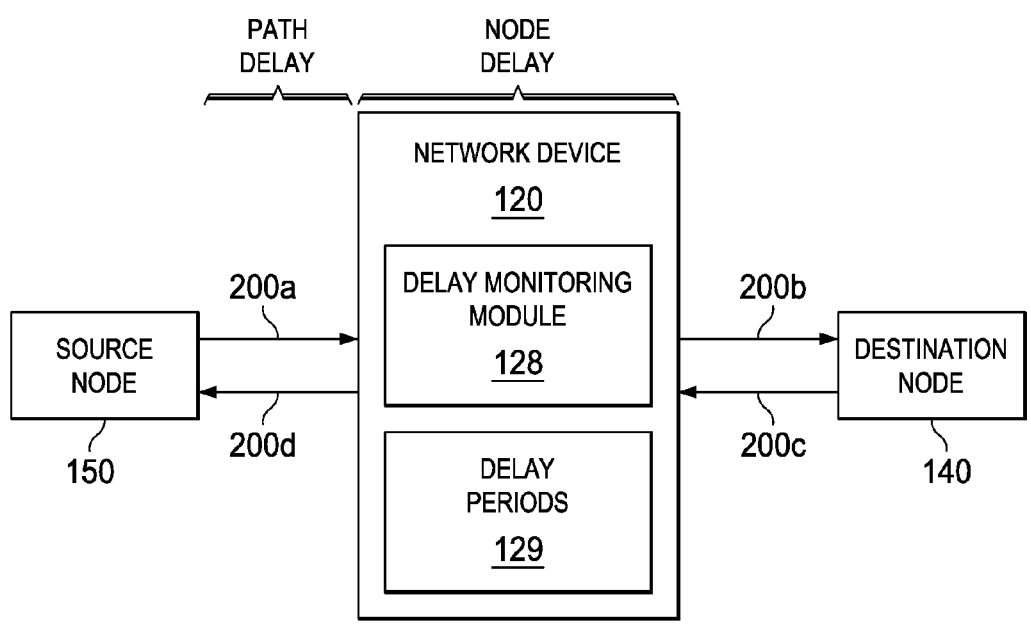
FIG. 2 is a simplified block diagram of an example transmission path of a flow in the communication system according to at least one embodiment.

Turning to FIG. 2, a simplified block diagram illustrates a transmission path of a flow initiated from a source node 150 to a destination node 140. The transmission path can include path segments 200a-200d, which may each include one or more other network elements in addition to network device 120. Path delay of path segment 200a refers to the amount of time (or transit time) it takes for a packet to reach network device 120 from source node 150. Node delay of network device 120 refers to the amount of time (or transit time) it takes for a packet to travel between ingress and egress points in network device 120. The transit time for a packet to travel between two points in a network (or within a network device) is the 'delay period' of the packet between the two points. Network congestion may occur at any node or link along the path and therefore, may occur in any path segment. For example, node delays may occur due to a bottleneck link (e.g., path segment 200b) that cannot handle the entire output load from network device 120. In this scenario, the ability of network device 120 to forward packets of a flow to destination node 140 may be limited. In some instances, node delays may occur when network device 120 does not have the processing power to handle the excess offered load.

In at least one embodiment, delay monitoring module 128 can perform delay detection activities to determine whether delay variation (i.e., increasing delay or decreasing delay) is occurring in a flow and to determine a delay baseline of the flow. As used herein, 'delay variation' is intended to mean changes in the delay of a flow that can be detected (e.g., observed, sensed, measured, determined, etc.). Delay monitoring module 128 of network device 120 can detect path delay variation for a flow across segment 200a and node delay variation for a flow traversing network device 120. Delay baselines for a flow across segment 200a and network device 120 may also be determined when the flow is not experiencing delay variations.

Source node 150 in FIG. 2 could be, for example, one of endpoints 110(1)-110(N). Destination node 140 could be, for example, a different one of the endpoints or one of remote endpoints 112(1)-112(M). Source node 150 may timestamp packets in the flow. In at least one embodiment, source time stamped data could be a G.711 Real-time Transport Protocol (RTP) source timestamp. The difference between the time a packet is received at network device 120 (i.e., ingress time) and the timestamp from source node 150 represents a transit time of the packet across path segment 200a. This path delay period can be stored in delay periods 129, in at least one embodiment, which can be a cache, a file, a repository, or any other suitable temporary data storage. Also, the difference between the ingress and egress times of a packet of the flow at network device 120 represents the transit time of the packet to traverse the node. This node delay period can also be stored in delay periods 129. In at least one embodiment, the delay periods for each flow may be distinguished from delay periods for other flows by associating them with a 5-tuple (e.g., source IP address/port number, destination IP address/port number, and protocol in use) of that flow.

Network device 120 can monitor a flow and detect a delay variation and a delay baseline of the monitored flow along a path segment. For example, in FIG. 2, a path delay variation and path delay baseline can be detected by evaluating a series of two or more delay periods of the monitored flow across path segment 200a. If these path delay periods measured across path segment 200a increase, then a determination may be made as to whether the increase in path delay is sufficient or not sufficient to cause the flow rate of the monitored flow to decrease if the monitored flow is delay-sensitive. If the increase is not sufficient, then network device 120 does not expect the monitored flow to rate adapt downward; however, if the increase is sufficient, then network device 120 expects the monitored flow to rate adapt downward if the monitored flow is delay-sensitive.

In at least some embodiments, determining whether the increase in path delay is sufficient or not sufficient to cause a delay-sensitive flow to rate adapt downward may be based on a delay increase measure, a delay baseline for the monitored flow across the path, or both. The delay increase measure can indicate an amount by which the delay periods of a flow increase as a function of time (e.g., a threshold rate of delay increase that is sufficient/insufficient), or any other suitable measure (e.g., any amount of increase between two sequential delay periods, an increase of at least a predetermined amount between two sequential delay periods, an increase of at least a predetermined amount between a first and last delay period over a predetermined time or number of packets, an increase that meets or exceeds a predetermined threshold, etc.).

Network device 120 can also monitor a flow and detect a delay variation and a delay baseline of a flow traversing a node. For example, in FIG. 2, a node delay variation and node delay baseline can be detected by evaluating a series of two or more delay periods of the monitored flow across network device 120. If these node delay periods measured across network device 120 increase, then a determination may be made as to whether the increase in node delay is sufficient or not sufficient to cause the flow rate of the monitored flow to decrease if the monitored flow is delay-sensitive. If the increase is not sufficient, then network device 120 does not expect the monitored flow to rate adapt downward; however, if the increase is sufficient, then network device 120 expects the monitored flow to rate adapt downward if the monitored flow is delay-sensitive.

In at least some embodiments, determining whether the increase in node delay is sufficient or not sufficient to cause a delay-sensitive flow to rate adapt downward may be based on a delay increase measure (as previously described), a delay baseline of the monitored flow across the node, or both. The delay increase measure used in path delay evaluations and node delay evaluations may be the same or may be different depending on particular needs and implementations.

After determining that an increase in path delay and/or node delay in a monitored flow is sufficient to cause a delay-sensitive flow to rate adapt downward, the monitored flow may be further monitored by network device 120 to assess the response of the protocol or application of the monitored flow to the increasing delay. The further monitoring can enable a determination as to whether the flow rate adapts by decreasing its bandwidth consumption sufficiently to be classified as delay-sensitive and assigned to a queue for delay-sensitive flows, or whether another classification and queue assignment is appropriate.

It will be apparent that the internal clocks of source node 150 and network device 120 may not be perfectly synchronized. Thus, transit time measurements across path segment 200a may include a differential between the clocks of source node 150 and network device 120. Consequently, these transit time measurements may equal the actual transit time plus/minus a constant value representing the difference between the clocks. Nevertheless, a series of delay periods having the same clock differential can indicate whether the delay across the path segment is increasing, decreasing, or unchanged.

In at least one embodiment, delay variation and delay baseline may be detected for path segment 200a and network device 120, separately, as described above. In some embodiments, network device 120 may only evaluate path delay, may only evaluate node delay, or may evaluate both separately as described above. In at least one other embodiment, however, the transit time measurements across path segment 200a and network device 120 may be combined. In this implementation, detecting delay variation and/or delay baseline may be based on a series of transit time measurements, where each transit time measurement represents a transit time (i.e., delay period) of a packet from source node 150 until the packet leaves network device 120 at the egress point. The transit time measurements may include the clock differential if the clocks of source node 150 and network device 120 are not synchronized. Furthermore, any suitable delay increase measure, as previously described herein, may be used determine whether an increase in delay, detected in the flow from the source node to the egress point of network device 120, is sufficient or not sufficient to cause a delay-sensitive flow to rate adapt downward.

FIGS. 3A-3C, 4A-4C, and 5A-5C are pictorial diagrams that illustrate example sequential views of various combinations of delay-sensitive flows, delay-insensitive nice flows, and naughty flows competing for bandwidth in communication system 100. In each of the FIGURES, Queue A represents delay-sensitive queue 130(A), Queue B represents delay-insensitive nice queue 130(B), and Queue C represents naughty queue 130(C).

Figure 3A:
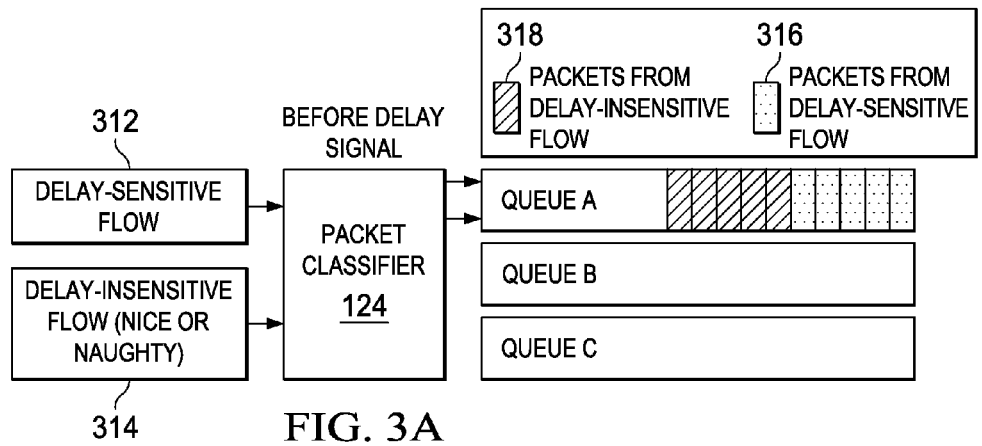
FIGS. 3A-3C are pictorial diagrams illustrating concurrent flows in a possible scenario associated with the communication system according to at least one embodiment.
Figure 3B:
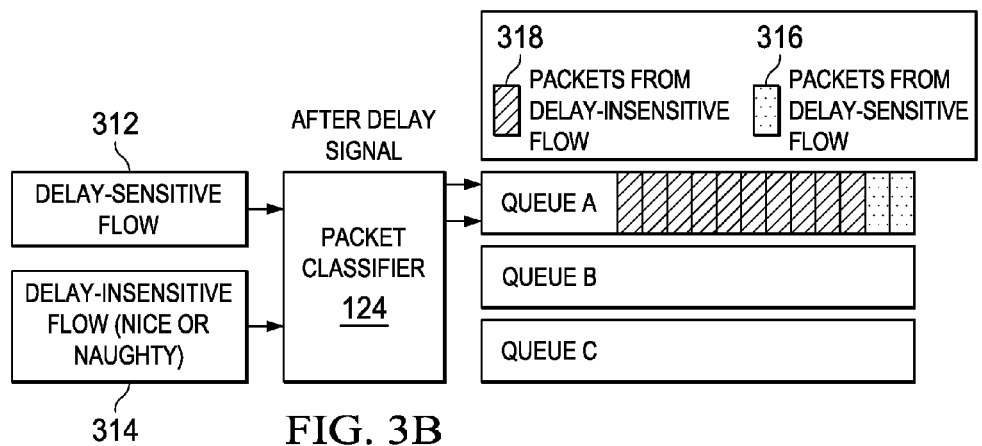
Figure 3C:
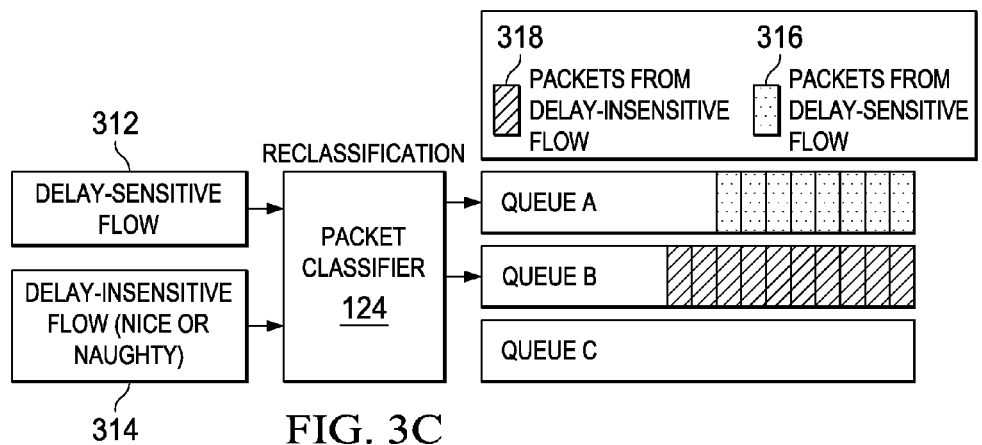

Turning to FIGS. 3A-3C, FIGS. 3A-3C depict a delay-sensitive flow 312 and a delay-insensitive flow 314 both assigned to Queue A, the response of the flows to congestion delay, and the result of operations of packet classifier 124 on the flows according to at least one embodiment. Delay-sensitive flow 312 is nice and responds to congestion delay signals. Delay-insensitive flow 314 may be nice (e.g., TCP flow that rate adapts based on packet loss) or naughty (i.e., does not respond to any congestion signals). Packets from delay-sensitive flow 312 are represented by blocks 316, and packets from delay-insensitive flow 314 are represented by blocks 318. FIG. 3A depicts packets 316 and packets 318 sharing Queue A before any delay based rate adaptation has been detected (e.g., sensed, observed, measured, or otherwise determined)

Flows 312 and 314 are monitored by packet classifier 124 for increasing delay and responsive rate adaptation. When network device 120 detects increases in the delay of flows 312 and 314, and determines the increases are sufficient to cause a delay-sensitive flow to rate adapt downward, network device 120 can monitor the subsequent behavior of the flows. The subsequent behavior of the flows can be monitored to determine whether the flows rate adapt downward sufficiently to be classified as delay-sensitive flows. As previously described herein, to determine whether a particular flow is rate adapting sufficiently after increasing delay is detected by network device 120, a series of two or more bandwidth measurements can be evaluated based on a bandwidth reduction measure. Also as previously described herein, network device 120 may detect increasing delay in a particular flow by evaluating a series of two or more delay periods for packets of the flow to travel from the source node to network device 120 and/or a series of two or more delay periods for packets of the flow to traverse network device 120. Alternatively, network device 120 may detect increasing delay in a particular flow by evaluating a series of two or more delay periods for packets of the flow to travel from the source node to an egress point of network device 120. Detecting increasing delay and responsive rate adaptation as described herein is also applicable to the other example illustrations in FIGS. 4A-4C and 5A-5C.

FIG. 3B illustrates delay-sensitive flow 312 reducing its load in response to a delay signal. As depicted in Queue A, packets 316 of delay-sensitive flow 312 have reduced their bandwidth consumption. Delay-insensitive flow 314, however, has not rate adapted downward in response to a delay signal. Instead, packets 318 of delay-insensitive flow 314 have increased their bandwidth consumption as depicted in Queue A. As previously described herein, a delay signal could be sensed by the endpoints of the flow, provided in the transport layer via a bit or other indication in the packets, or provided at any higher layer such as the application or session layer.

Because delay-sensitive flow 312 rate adapts downward sufficiently in response to delay signals, network device 120 does not reclassify delay-sensitive flow 312, and packets 316 remain assigned to Queue A as depicted in FIG. 3C. For delay-insensitive flow 314, however, when network device 120 detects that delay-insensitive flow 314 has not rate adapted downward by a sufficient amount (e.g., based on a bandwidth reduction measure) during the period of congestion, then network device 120 can reclassify delay-insensitive flow 314 and assign the flow to another queue, such as Queue B. In at least one embodiment, future packets from flow 314 are assigned to Queue B. The example illustration in FIG. 3C reflects a future time after flow 314 has been reclassified and when all existing packets of flow 314 have been serviced from Queue A or otherwise moved from Queue A to Queue B. Network device 120 may not know whether delay-insensitive flow 314 is delay-insensitive nice or naughty and, therefore, may assign flow 314 to Queue B, until its behavior proves that it is naughty and should be assigned to Queue C.

Figure 4A:
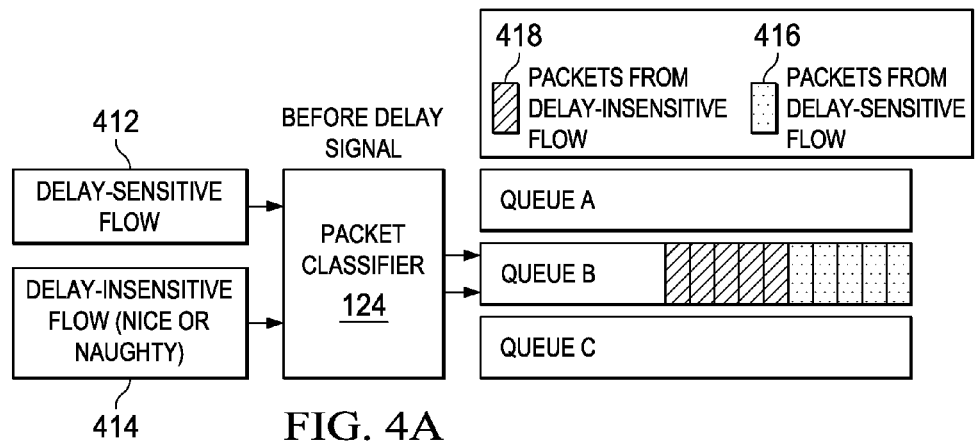
FIGS. 4A-4C are pictorial diagrams illustrating concurrent flows in another possible scenario associated with the communication system according to at least one embodiment.
Figure 4B:
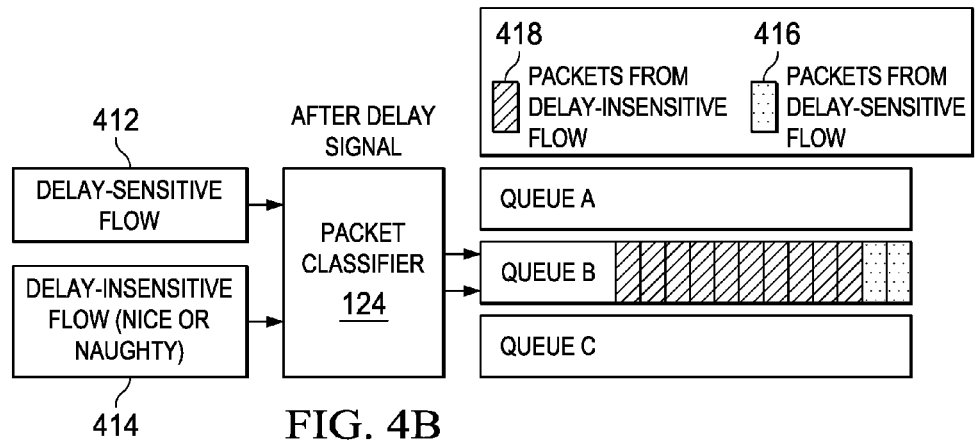
Figure 4C:
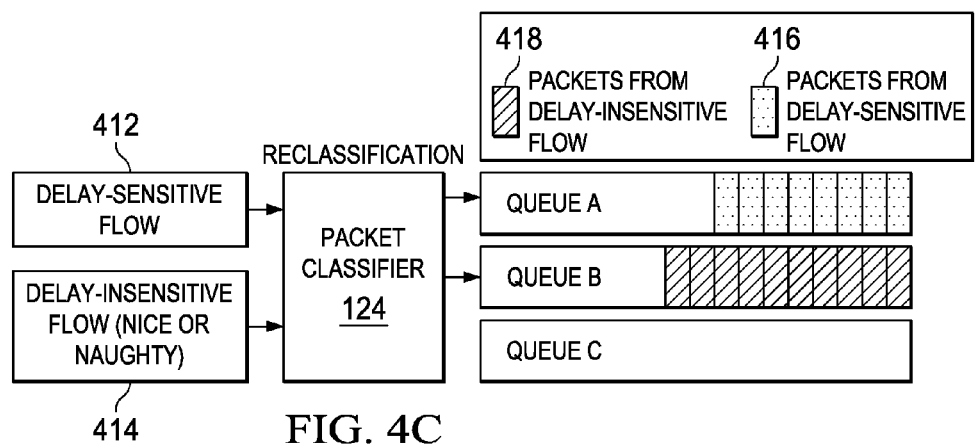

FIGS. 4A-4C depict a delay-sensitive flow 412 and a delay-insensitive flow 414 both assigned to Queue B, the response of the flows to congestion delay, and the result of operations of packet classifier 124 on the flows according to at least one embodiment. Delay-sensitive flow 412 is nice and responds to congestion delay signals. Delay-insensitive flow 414 may be nice (e.g., TCP flow that rate adapts based on packet loss) or naughty (i.e., does not respond to any congestion signals). Packets from delay-sensitive flow 412 are represented by blocks 416, and packets from delay-insensitive flow 414 are represented by blocks 418. FIG. 4A depicts packets 416 and packets 418 sharing Queue B before any delay based rate adaptation has been detected.

Flows 412 and 414 are monitored by packet classifier 124 for increasing delay and responsive rate adaptation. When network device 120 detects increases in the delay of flows 412 and 414, and determines the increases are sufficient to cause a delay-sensitive flow to rate adapt downward, network device 120 can monitor the subsequent behavior of the flows. The subsequent behavior of the flows can be monitored to determine whether the flows rate adapt downward sufficiently to be classified as delay-sensitive flows. FIG. 4B illustrates delay-sensitive flow 412 reducing its load in response to a delay signal. As depicted in Queue B, packets 416 of delay-sensitive flow 412 have reduced their bandwidth consumption. Delay-insensitive flow 414, however, has not rate adapted downward in response to a delay signal. Instead, packets 418 of delay-insensitive flow 414 have increased their bandwidth consumption in Queue B.

Although network device 120 may determine that delay-sensitive flow 412 rate adapts downward sufficiently in response to delay signals, flow 412 may not be promoted until a period of time has passed. Once a sufficient downward rate adaptation has been detected (e.g., based on a bandwidth reduction measure) and the propagation delay period for flow 412 has passed, then network device 120 can reclassify delay-sensitive flow 412 and assign the flow to a delay-sensitive queue, such as Queue A. Thus, packets 416 of delay-sensitive flow 412 are subsequently added to Queue A as depicted in FIG. 4C. In at least one embodiment, future packets from flow 412 are assigned to Queue A. The example illustration of FIG. 4C reflects a future time after flow 412 has been reclassified and when all existing packets of flow 412 have been serviced from Queue B or otherwise moved from Queue B to Queue A. Delay-insensitive flow 414, however, may not be reclassified unless it is determined that the flow does not rate adapt downward based on packet loss. Thus, packets 418 can remain assigned to Queue B until the behavior of flow 414 proves that it deserves a different classification and queue reassignment.

Figure 5A:
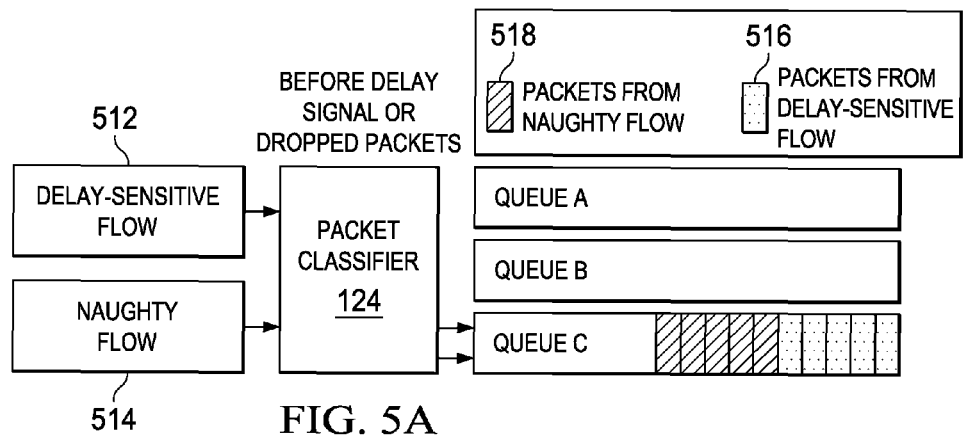
FIGS. 5A-5C are pictorial diagrams illustrating concurrent flows in yet another possible scenario associated with the communication system according to at least one embodiment.
Figure 5B:
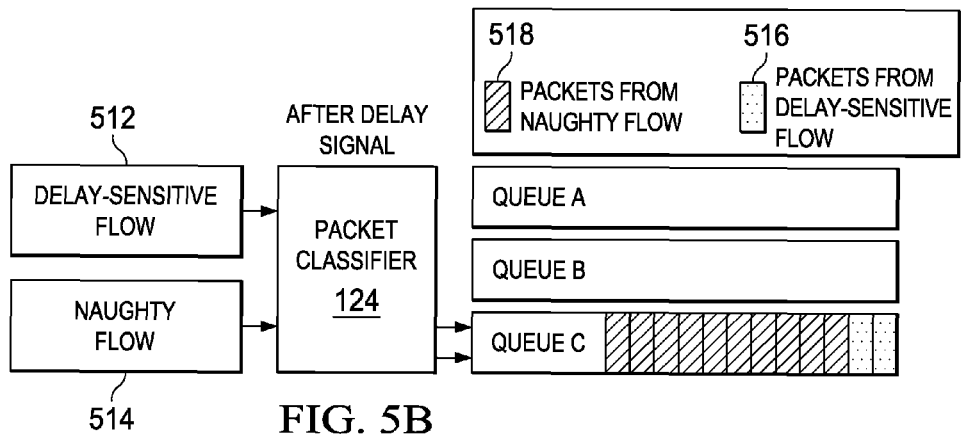
Figure 5C:
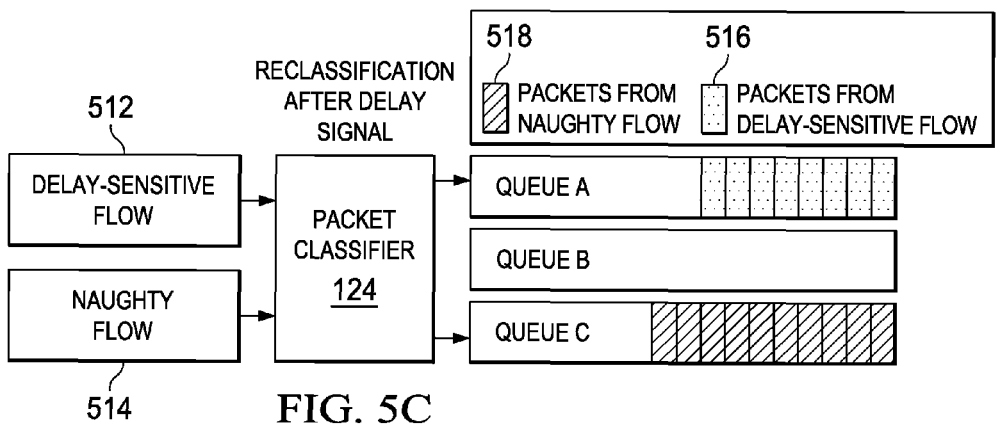

FIGS. 5A-5C depict a delay-sensitive flow 512 and a naughty flow 514 both assigned to Queue C, the response of the flows to congestion delay, and the result of operations of packet classifier 124 on the flows according to at least one embodiment. Delay-sensitive flow 512 is nice and responds to congestion delay signals. Naughty flow 514 does not respond to any congestion signals. Packets from delay-sensitive flow 512 are represented by blocks 516, and packets from naughty flow 514 are represented by blocks 518. FIG. 5A depicts packets 516 and packets 518 sharing Queue C before any delay based rate adaptation has been detected.

Flows 512 and 514 are monitored by packet classifier 124 for increasing delay and responsive rate adaptation. When network device 120 detects increases in the delay of flows 512 and 514, and determines the increases are sufficient to cause a delay-sensitive flow to rate adapt downward, network device 120 can monitor the subsequent behavior of the flows. The subsequent behavior of the flows can be monitored to determine whether the flows rate adapt downward sufficiently to be classified as delay-sensitive flows. FIG. 5B illustrates delay-sensitive flow 512 reducing its load in response to a delay signal. As depicted in Queue C, packets 516 of delay-sensitive flow 512 have reduced their bandwidth consumption. Naughty flow 514, however, has not rate adapted downward in response to a delay signal. Instead, packets 518 of naughty flow 514 have increased their bandwidth consumption in Queue C.

Although network device 120 may determine that delay-sensitive flow 512 rate adapts downward sufficiently in response to delay signals, flow 512 may not be promoted until a period of time has passed. Once the a sufficient downward rate adaptation has been detected (e.g., based on a bandwidth reduction measure) and the propagation delay period for flow 512 has passed, then network device 120 may reclassify delay-sensitive flow 512 and assign the flow to another queue that responds to congestion signals. In at least one implementation, a flow in a naughty queue that proves it adapts by a sufficient amount (e.g., based on a bandwidth reduction measure) in response to delay signals can be promoted directly to a delay-sensitive queue, such as Queue A. In this implementation, packets 516 are subsequently added to Queue A as depicted in FIG. 5C. In at least one other embodiment, however, a flow in a naughty queue that proves it sufficiently adapts to delay signals can be promoted in a step-wise order to a next higher queue, such as Queue B. In this scenario, flow 512 may, during subsequent periods of congestion, again prove that it sufficiently rate adapts downward in response to delay signals and accordingly, be promoted to a next higher queue, such as Queue A.

In at least one embodiment, future packets from flow 512 are assigned to the new queue (e.g., Queue A in this example). The example illustration in FIG. 5C reflects a future time after flow 512 has been reclassified and when all existing packets of flow 512 have been serviced from Queue C or otherwise moved from Queue C to Queue A. Naughty flow 514 is not reclassified as it does not respond to any congestion signals. Thus, packets 518 remain assigned to Queue C as depicted in FIG. 5C.

In at least some embodiments, when a flow is reclassified and reassigned to another queue, only the future packets (i.e., packets subsequently received by the network device) and possibly the current packet are stored in the new queue. Packets already stored in the previously assigned queue may remain there until serviced by that queue (e.g., transmitted to a next node in the path). In at least one other embodiment, however, after a flow is reclassified and reassigned to a new queue, packets that are currently stored in the previously assigned queue may be moved to the new queue.

Figure 6:
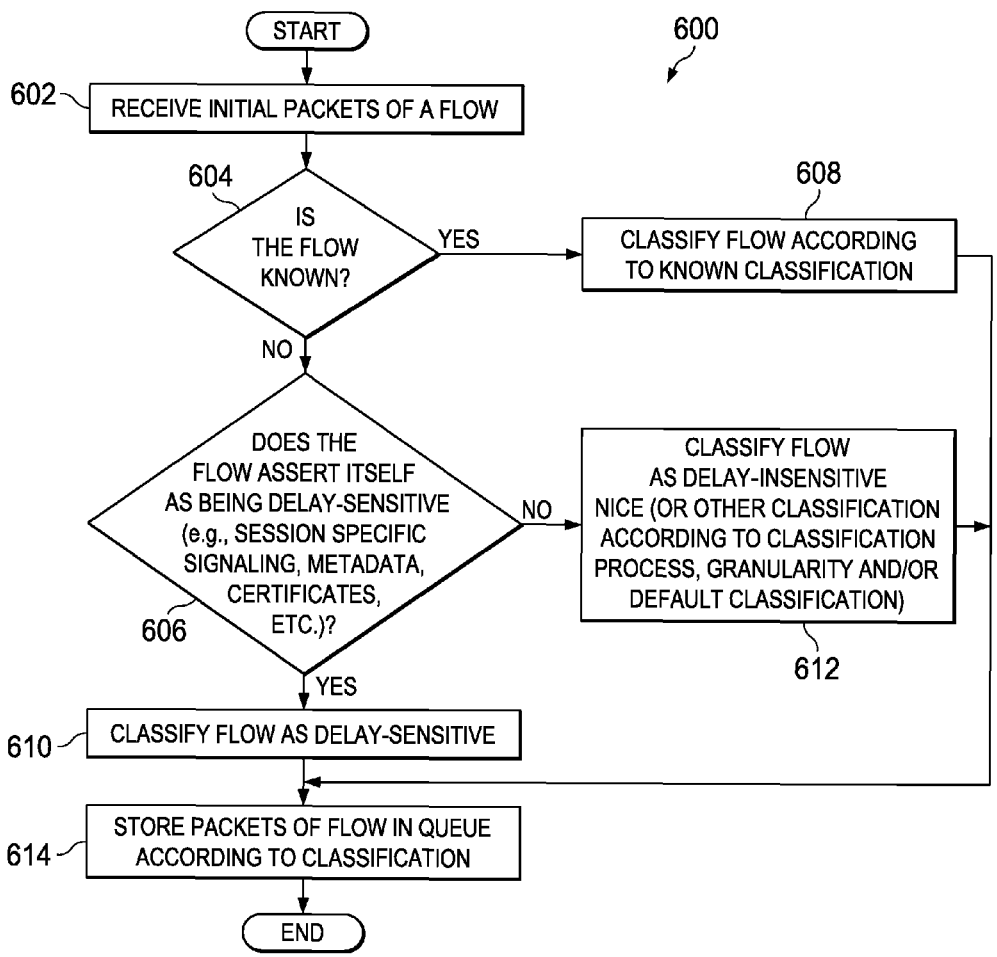
FIG. 6 shows a simplified flowchart illustrating possible activities associated with receiving a flow in a network device of the communication system.

Turning to FIG. 6, a flowchart 600 illustrates potential operations that may be associated with embodiments described herein. In at least one embodiment, one or more sets of operations correspond to activities of FIG. 6. In at least one embodiment, network device 120 may comprise means such as one or more processors (e.g., processor 121), for performing the operations. In one example, at least some operations shown in flowchart 600 may be performed by classification module 125 of packet classifier 124 when executed by one or more processors (e.g., processor 121). For ease of reference, operations of flowchart 600 may be described without specific reference to particular modules of network device 120.

At 602, network device 120 receives initial packets of a flow. At 604, network device 120 may determine whether the flow is already known. Certain flows may have a predetermined known classification (e.g., pre-configured list of naughty protocols, DPI used to identify a naughty flow). If the flow is known, then at 608, network device 120 can classify the flow according to its known classification. Packets of the flow are then assigned to and stored in a queue at 614, according to the classification of the flow (e.g., naughty queue 130(C) for flows classified as naughty).

If the received flow is not known, as determined at 604, then at 606, a determination can be made as to whether the flow asserts itself as being delay-sensitive. The received flow could potentially assert itself as delay-sensitive via session specific signaling, metadata, trust certificates, etc. If the flow asserts that it is a delay-sensitive flow, then it can be classified as delay-sensitive at 610. Packets of the flow are then assigned to and stored in a queue, at 614, according to the classification of the flow (e.g., delay-sensitive queue 130(A) for flows classified as delay-sensitive). Packets of the flow may continue to be stored in the assigned queue unless the flow's behavior during a period of congestion indicates the flow does not respond to delay signals. In this case, the flow may be reclassified and reassigned to another queue. It should be apparent that a flow may also assert another classification, such as delay-insensitive nice or naughty classifications. Thus, in at least some embodiments, a flow could be classified according to multiple possible classifications asserted by the flow.

If the received flow does not assert itself as delay-sensitive as determined at 606, then at 612, network device 120 may rely on a default classification for the flow. In at least one embodiment, an unclassified flow may be classified as delay-insensitive nice and packets may be assigned to and stored in a queue at 614, according to the classification (e.g., delay-insensitive nice queue 130(B)). Any other default classification may be used based on particular needs and implementations, and may depend on the granularity of the configured queues. For example, a dedicated unclassified queue for unclassified or unknown flows may be provided in at least one embodiment.

Figure 7A:
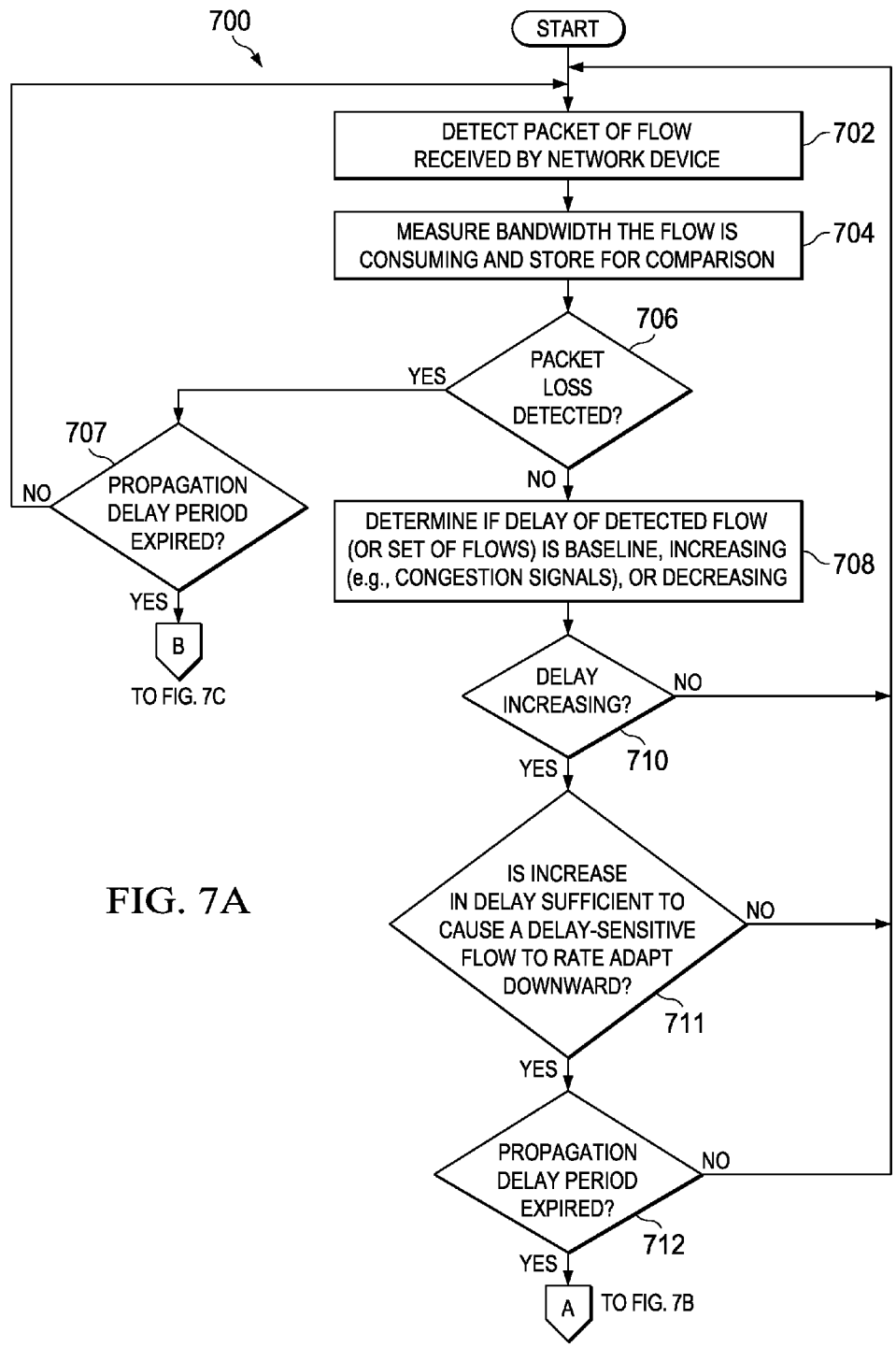
FIGS. 7A-7C show a simplified flowchart illustrating possible activities associated with flows traversing a network device of the communication system.
Figure 7B:
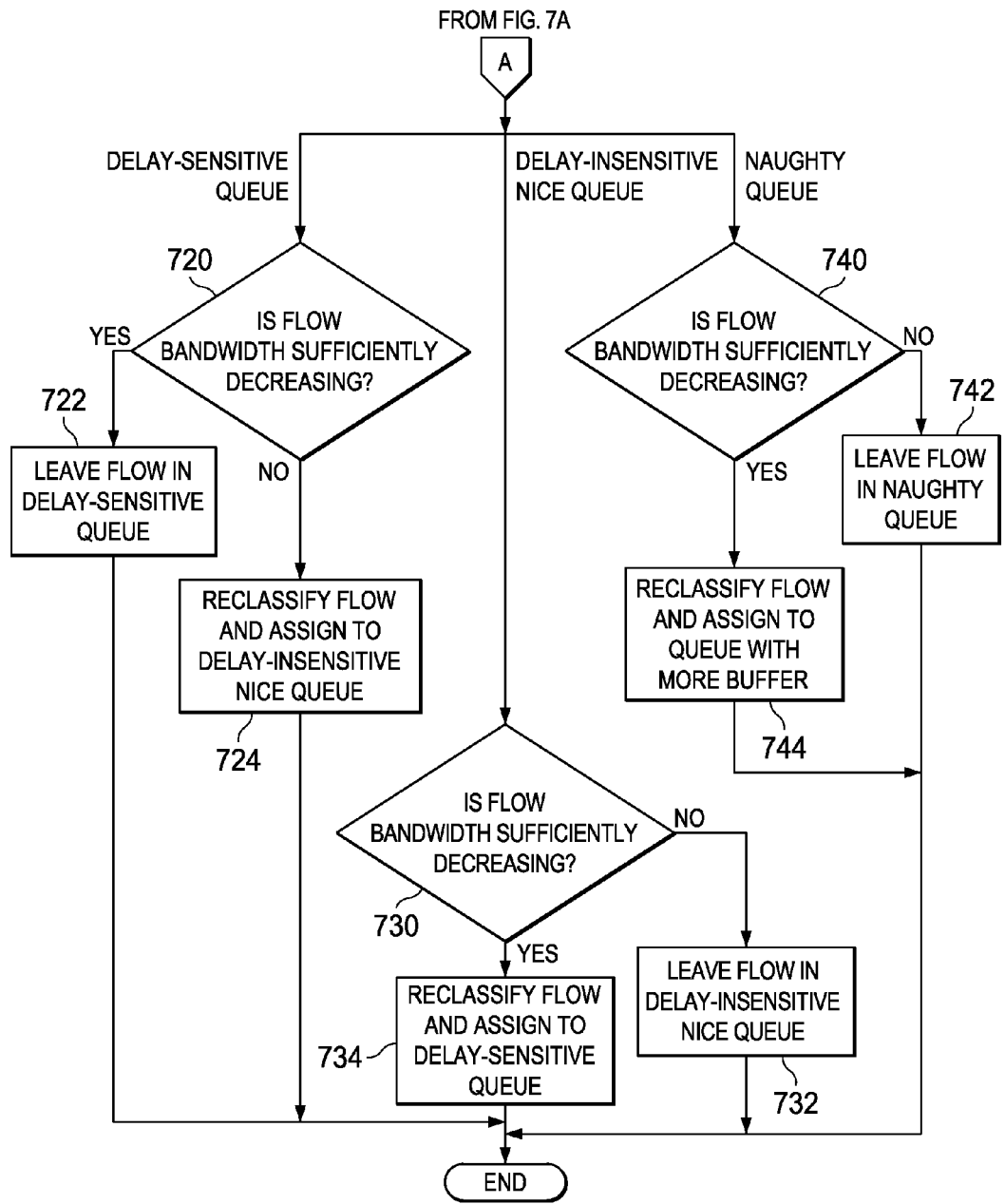
Figure 7C:
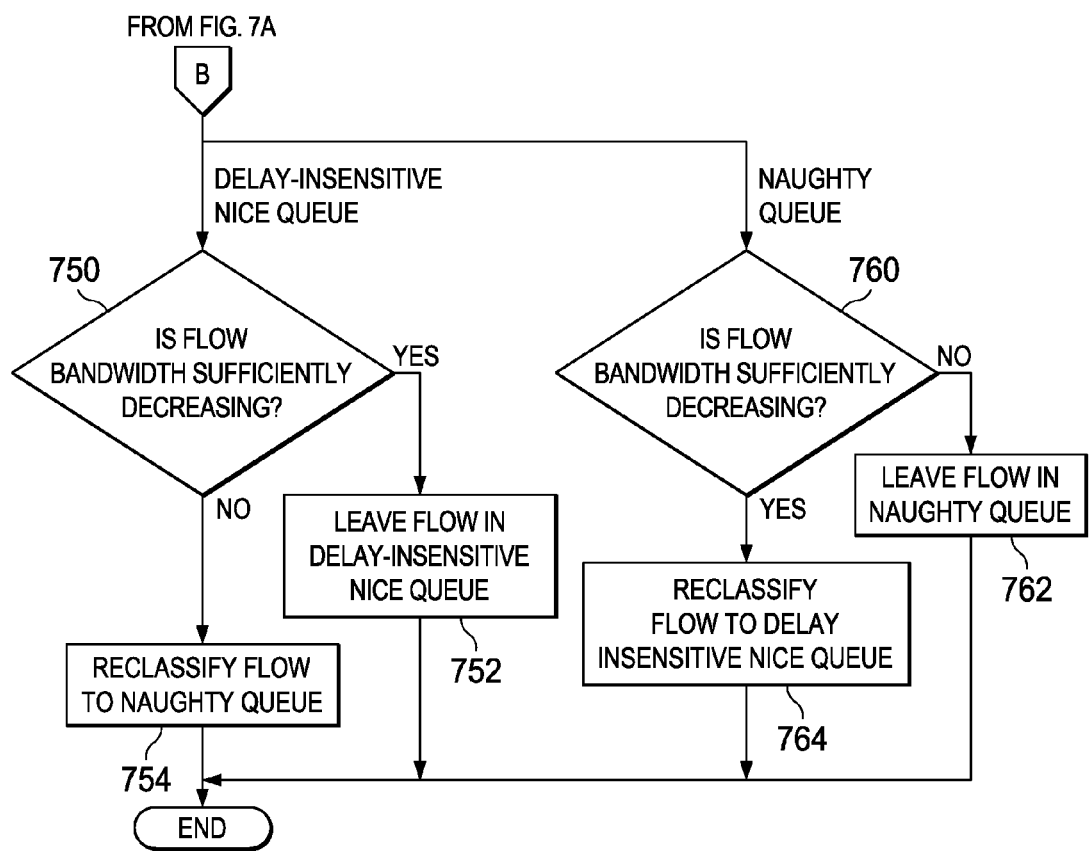

Turning to FIGS. 7A-7C, a flowchart 700 illustrates potential operations that may be associated with embodiments described herein. In at least one embodiment, one or more sets of operations correspond to activities of FIGS. 7A-7C. In at least one embodiment, network device 120 may comprise means such as one or more processors (e.g., processor 121), for performing the operations. In one example, when executed by one or more processors (e.g., processor 121), at least some operations shown in flowchart 700 may be performed by reclassification module 126 of packet classifier 124, and at least some operations shown in flowchart 700 may be performed by delay monitoring module 128 of packet classifier 124. For ease of reference, operations shown in flowchart 700 may be described without specific reference to particular modules of network device 120.

Generally, each flow traversing network device 120 is monitored to measure the bandwidth the flow is consuming, and to determine whether delay is increasing in the flow. In at least one implementation, the bandwidth measurements and delay determinations may be performed on a set of flows that are classified together. These operations may be performed on all packets of a flow (and/or set of flows) traversing network device 120. In at least some other embodiments, at least some flows may not be monitored continuously, but may be periodically monitored, and flows that do not consume significant bandwidth may not be monitored at all. Periodic monitoring may be used, for example, to ensure a previously classified flow continues to rate adapt (or not) according to its classification and assigned queue. For ease of illustration, operations shown and described with reference to flowchart 700 are described with reference to a packet of a single flow traversing network device 120. It will be apparent, however, that these operations may be performed on any or all packets of a flow (and/or packets of a set of flows) traversing network device 120.

With reference to FIG. 7A, at 702, network device 120 detects a packet of a flow received by network device 120. Network device 120 may begin monitoring the flow. At 704, network device 120 measures the amount of bandwidth the flow is consuming. In at least one embodiment, the bandwidth measurement may be stored (e.g., in bandwidth measurements 127) for comparison with prior bandwidth measurements if increasing delay is detected, and/or for comparison with subsequent bandwidth measurements if increasing delay is detected in subsequent packets of the flow.

At 706, it is determined whether packet loss has been detected in the flow. Packet losses in network device 120 can occur in queues other than those designated for delay-sensitive flows. For example, packet losses may occur in delay-insensitive nice queue 130(B) and naughty queue(C), but should not happen in delay-sensitive queue 130(A). For known protocols (e.g., TCP, SCTP, RTP, etc.) sequence numbers of the flow can be saved by network device 120 for comparison and identification of discontinuities indicating packet losses in the flow.

When packet loss has not been detected in the flow, at 708, network device 120 evaluates the flow to determine whether delay of the flow is baseline, increasing, or decreasing. Example techniques to identify delay variation in the flow are described in more detail with reference to FIGS. 8A-8B and are also previously described herein. At 710, if it is determined that the delay is not increasing, then network device 120 may perform other operations such as determining a delay baseline for the flow, or allocating more bandwidth for the flow if the delay is decreasing. If the delay of the flow is increasing, however, then at 711, a determination can be made as to whether the increase is sufficient to cause the flow rate of a delay-sensitive flow to decrease (or rate adapt downward). The determination as to whether the increase in delay in the flow is sufficient may be based on a delay increase measure. If it is determined that the increase in delay in the flow is not sufficient to cause a delay sensitive flow to rate adapt downward), then the flow can, at least temporarily, retain its classification because it is not creating a bloat problem in the queue, and network device 120 can wait to receive and detect another packet of the flow at 702. However, if network device 120 determines the increase in delay is sufficient to cause a delay-sensitive flow to rate adapt downward, then further evaluations can be performed to determine whether the flow should be reclassified. A propagation delay period timer for the flow may be started if it has not already been started in response to previously detecting a delay increase that is sufficient to cause a delay-sensitive flow to rate adapt downward.

One of the further evaluations to be performed at 712, is whether the propagation delay period for the flow has expired (e.g., via the propagation delay period timer). In at least one embodiment, an estimated propagation delay period of the flow is evaluated relative to the time that the increased delay in the flow is initially detected by network device 120. Thus, a flow may not be reclassified until a subsequent packet (or packets) are received after an initial determination that a flow is experiencing a delay increase that is sufficient to cause a delay-sensitive flow to rate adapt downward. This can give the flow time to respond to delay signals associated with the flow that are detected by the corresponding source node of the flow. At 712, if the propagation delay period has not expired since the delay increase was initially detected, then the source node may not have had time to respond to any delay signal. In this case, the flow may not be reclassified and network device 120 can wait to receive another packet of the flow at 702. If the propagation delay period has expired, however, then the source node has had time to detect delay signals associated with the flow and to respond accordingly. In this case, further evaluations can be performed according to the classification of the flow and queue to which the flow is currently assigned.

With reference to FIG. 7B, if the propagation delay period has expired as determined at 712, and the flow is currently assigned to a delay-sensitive queue (e.g., delay-sensitive queue 130(A)), then a determination is made at 720, as to whether the amount of bandwidth the flow is consuming is sufficiently decreasing (if the flow is rate adapting downwardly enough) to remain classified as delay-sensitive. In at least one embodiment, this may be determined by evaluating a series of bandwidth measurements according to a bandwidth reduction measure. If the amount of bandwidth consumed by the flow has sufficiently decreased according to the bandwidth reduction measure, then the flow is not reclassified and remains in the delay-sensitive queue, as indicated at 722.

If the amount of bandwidth consumed by the flow has not sufficiently decreased according to the bandwidth reduction measure (e.g., the flow has not rate adapted downward in response to delay signals, the flow has not rate adapted downward enough, the flow has not rate adapted downward quickly enough), then at 724, the flow may be reclassified and reassigned to another queue, based on the number and types of available queues. In at least one implementation, the queue to which the flow is reassigned could have a moderate amount of buffer, because not responding to delay signals does not necessarily indicate the flow is naughty. For example, the flow may be reclassified as delay-insensitive nice and reassigned to a delay-insensitive nice queue (e.g., delay-insensitive nice queue 130(B)).

If the propagation delay period has expired as determined at 712, and the flow is currently assigned to a delay-insensitive nice queue (e.g., delay-insensitive queue 130(B)), then a determination is made at 730, as to whether the amount of bandwidth the flow is consuming is sufficiently decreasing to deserve reclassification and promotion of the flow to another queue (e.g., delay-sensitive queue 130(A)). If the amount of bandwidth consumed by the flow has sufficiently decreased according to the bandwidth reduction measure, then at 734, the flow may be reclassified and reassigned to another queue, based on the number and type of available queues. In at least one implementation, the queue to which the flow is reassigned could have more buffer to accommodate delay-sensitive flows. For example, the flow may be reclassified as delay-sensitive and promoted to a delay-sensitive queue (e.g., delay-sensitive queue 130(A)).

If the amount of bandwidth consumed by the flow has not sufficiently decreased according to the bandwidth reduction measure), then at 732, the flow is not reclassified and remains, at least temporarily, in the delay-insensitive nice queue. In this case, the flow could potentially be a naughty flow, for example, that was initially unclassified and given a default classification of delay-insensitive nice until proven otherwise. Regardless of whether the flow is actually naughty or correctly classified as delay-insensitive nice, the flow will not adversely impact delay-sensitive flows that are reassigned (or initially assigned) to a delay-sensitive queue.

If the propagation delay period has expired as determined at 712, and the flow is currently assigned to a naughty queue (e.g., naughty queue 130(C)), then a determination is made at 740, as to whether the amount of bandwidth the flow is consuming is sufficiently decreasing to deserve reclassification and promotion of the flow to another queue (e.g., delay-sensitive queue 130(A) or delay-insensitive nice queue 130(B)). If the amount of bandwidth consumed by the flow has sufficiently decreased according to the bandwidth reduction measure, then at 744, the flow may be reclassified and reassigned to another queue, based on the number and type of available queues. In at least one implementation, the queue to which the flow is reassigned could have more buffer to accommodate delay-sensitive flows. For example, the flow may be reclassified as delay-sensitive and promoted to a delay-sensitive queue (e.g., delay-sensitive queue 130(A)). In another implementation, the flow may not be promoted directly to a delay-sensitive queue. Instead, the flow may be promoted to an intermediate queue with more buffer than the naughty queue (e.g., delay-insensitive nice queue 130(B)). During subsequent periods of congestion, the flow may prove it behaves as a delay-sensitive flow and may be promoted to a delay-sensitive queue.

If the amount of bandwidth consumed by the flow has not sufficiently decreased according to the bandwidth reduction measure, then at 742, the flow is not reclassified and remains in the naughty queue. In this case, the flow could potentially be a naughty flow or a delay-insensitive nice flow, for example, that was wrongly classified and assigned to the naughty queue. Regardless of whether the flow is delay-insensitive nice or naughty, the flow will not affect delay-sensitive flows that are reassigned (or initially assigned) to a delay-sensitive queue.

With reference again to 706 in FIG. 7A, if one or more packet losses are detected in the flow, for example in delay-insensitive queue 130(B) or naughty queue 130(C), then a determination may be made as to whether the propagation delay period for the flow has expired since the packet loss occurred (e.g., via a propagation delay period timer that is started when a packet loss is first detected). In at least one embodiment, an estimated propagation delay period of the flow can be evaluated relative to the time that the packet loss in the flow is initially detected by network device 120. Thus, a flow may not be reclassified until a subsequent packet (or packets) are received after an initial detection of packet loss, which can give the flow time to respond to loss signals associated with the flow.

At 707, if the propagation delay period has not expired since packet loss was initially detected, then the source node has not had time to respond to the loss signal. In this case, the flow may not be reclassified and network device 120 can wait to receive another packet of the flow at 702. If the propagation delay period has expired, however, then the source node has had time to detect loss signals associated with the flow and to respond accordingly. In this case, further evaluations can be performed according to the classification of the flow and queue to which the flow is currently assigned.

With reference to FIG. 7C, if the propagation delay period has expired as determined at 707, and the flow is currently assigned to a delay-insensitive nice queue (e.g., delay-insensitive nice queue 130(B)), then a determination is made at 750, as to whether the amount of bandwidth the flow is consuming is sufficiently decreasing (if the flow is rate adapting downwardly enough) to remain classified as delay-insensitive nice. In at least one embodiment, this may be determined by evaluating a series of bandwidth measurements according to a bandwidth reduction measure for packet loss flows. The bandwidth reduction measure for loss adaptive flows can be the same or different than the bandwidth reduction measure for delay adaptive flows. If the amount of bandwidth consumed by the flow has sufficiently decreased according to the bandwidth reduction measure, then at 752, the flow is not reclassified and remains in the delay-insensitive nice queue.

If the amount of bandwidth consumed by the flow has not sufficiently decreased according to the bandwidth reduction measure (e.g., the flow has not rate adapted downward in response to loss signals), then at 754, the flow may be reclassified and reassigned to another queue, based on the number and types of available queues. In at least one implementation, the queue to which the flow is reassigned could have a lesser amount of buffer, because not responding to loss signals indicates the flow is naughty. For example, the flow may be reclassified to naughty and reassigned to a naughty queue (e.g., naughty queue 130(C)).

If the propagation delay period has expired as determined at 707, and the flow is currently assigned to a naughty queue (e.g., naughty queue 130(C)), then a determination is made at 760, as to whether the amount of bandwidth the flow is consuming is sufficiently decreasing to deserve reclassification and promotion of the flow to another queue (e.g., delay-insensitive queue 130(B)). If the amount of bandwidth consumed by the flow has sufficiently decreased according to the bandwidth reduction measure, then at 764, the flow may be reclassified and reassigned to another queue, based on the number and type of available queues. In at least one implementation, the queue to which the flow is reassigned could have more buffer than a naughty queue to accommodate delay-insensitive nice flows. For example, the flow may be reclassified to delay-insensitive nice and promoted to a delay-insensitive nice queue (e.g., delay-insensitive nice queue 130(B)). If the amount of bandwidth consumed by the flow has not sufficiently decreased according to the bandwidth reduction measure, then at 762, the flow is not reclassified and remains in the naughty queue. The flow will not adversely impact delay-insensitive nice flows that are reassigned (or initially assigned) to a delay-insensitive queue.

Although not shown in FIGS. 7A-7C, flows from ECN-enabled protocols may be classified and/or reclassified similarly to flows from loss adaptive protocols. In an ECN flow, packets are marked that signal impending congestion, and an ECN-enabled protocol rate adapts in response to the marking. If an ECN flow is in a delay-sensitive queue, however, it does not respond to delay signals and therefore, could be demoted to another queue during a period of increasing delay. The ECN system can identify flows that that do not respond to ECN marks. These flows can be demoted to a naughty queue from delay-insensitive nice queue 130(B) for example. If a nice ECN-enabled flow (i.e., an ECN-enabled flow that does respond to ECN markings) is mistakenly classified as naughty and assigned to a naughty queue, the flow may be promoted to another queue, such as delay-insensitive nice queue 130(B), after its behavior proves that it responds to ECN markings and does not cause congestion events.

Over time, a confidence score could be assigned to the various flow classifications. Long-lived flows may be more likely to be classified correctly, and the score could provide protection against unwarranted demotion to another queue. A short-lived flow can have the benefit of the doubt initially by being classified in a particular queue (e.g., delay-insensitive nice queue 130(B)) until its behavior proves it should be classified otherwise (e.g., promoted or demoted).

Regarding classification/reclassification and assignment/reassignment of a flow, it will be apparent that these activities could be accomplished by any number of operations to ensure a particular flow received by a network device is stored in the appropriate queue. For example, any one or more operations that cause packets of a flow to be stored in a particular queue may represent the classification/reclassification and assignment/reassignment of that flow. In other examples, distinct operations may be associated with classification/reclassification of a flow and assignment/reassignment of a flow. For example, classification/reclassification operations could include mapping classifications to flow identifiers, while assignment/reassignment operations could include mapping queues to flow identifiers. In at least one example, a flow identifier for a particular flow could be a 5-tuple (e.g., source IP address/port number, destination IP address/port number, and protocol in use) associated with the particular flow. Thus, flow classification/reclassification operations may or may not be distinct from flow assignment/reassignment operations, depending on the particular implementation.

Figure 8A:
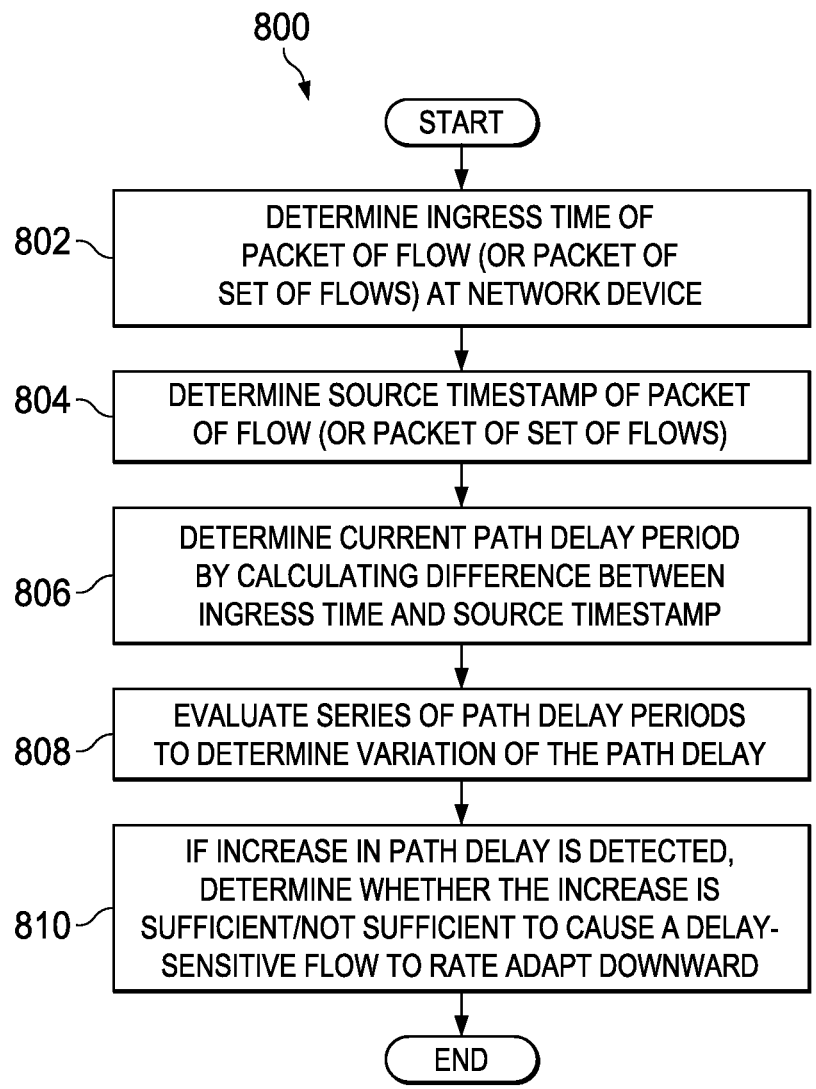
FIG. 8A is a simplified flowchart illustrating possible activities associated with measuring delay variation in the communication system.
Figure 8B:
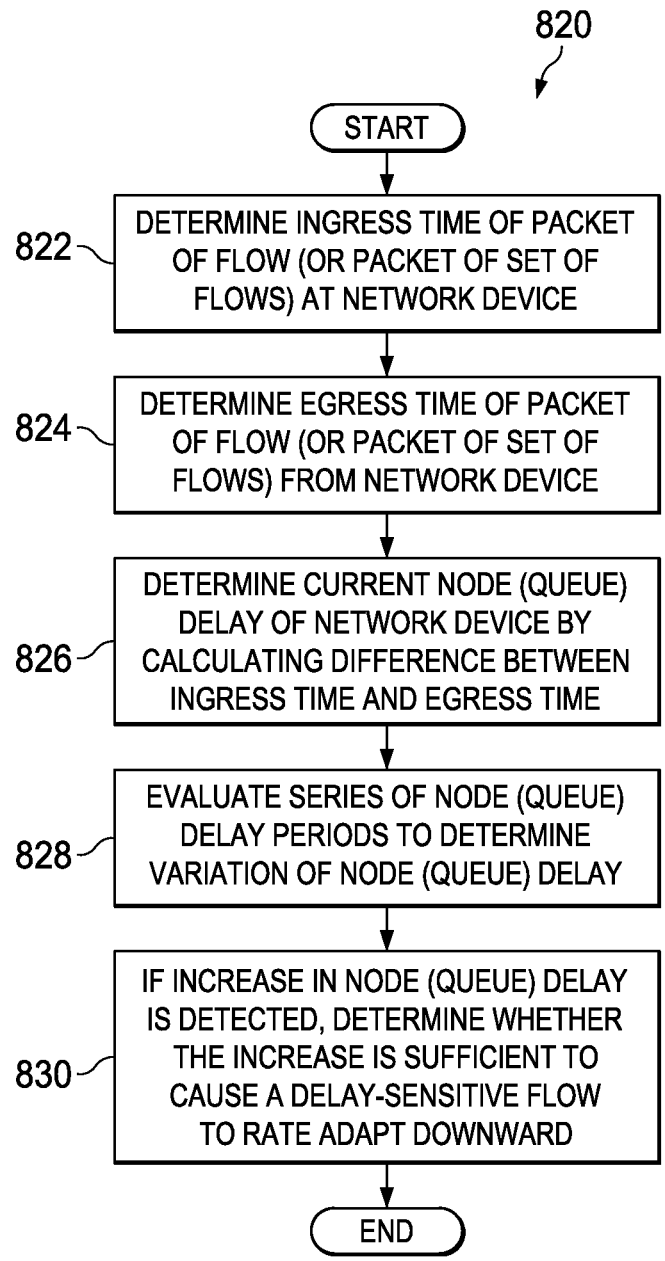
FIG. 8B is a simplified flowchart illustrating further possible activities associated with a measuring delay variation in the communication system.

FIGS. 8A and 8B show flowcharts 800 and 820, respectively, that illustrate potential operations that may be associated with example techniques for detecting when a flow is experiencing increasing delay in accordance with one or more embodiments described herein. In at least one embodiment, one or more sets of operations correspond to activities of FIGS. 8A-8B. In at least one embodiment, network device 120 may comprise means such as one or more processors (e.g., processor 121), for performing the operations. In one example, when executed by one or more processors (e.g., processor 121), at least some operations shown in flowcharts 800 and 820 may be performed by delay monitoring module 128 of packet classifier 124. For ease of reference, operations shown in flowcharts 800 and 820 may be described without specific reference to particular modules of network device 120.

FIG. 8A illustrates operations that may be performed to detect increasing delay in a flow along a transmission path from a source node to network device 120. At 802, an ingress time of a packet of a flow (or a packet of a set of flows) being monitored at network device 120 is determined. At 804, a timestamp of the packet from the source node (e.g., endpoint 110(1)) is determined. At 806, the current path delay period from the source node to network device 120 is calculated by taking the difference between the ingress time and the timestamp. At 808, a series of two or more path delay periods, which includes the current path delay period and one or more prior path delay periods, are evaluated to determine variation of the path delay, if any (i.e., baseline, increasing or decreasing).

If an increase in delay in the monitored flow is detected at 808, then at 810, the increase can be evaluated to determine whether the increase is sufficient or not sufficient to cause a delay-sensitive flow to rate adapt downward. If the evaluation of the series of path delay periods indicates that the increase in delay is sufficient to cause a delay-sensitive flow to rate adapt (i.e., decrease the flow rate), then the monitored flow can be further monitored to assess its behavior in response to the increasing delay. If the evaluation of the series of path delay periods indicates that the increase in delay is not sufficient to cause a delay-sensitive flow to rate adapt, then the monitored flow may continue to be monitored for indications of greater increasing delay across the path. In at least one embodiment, the evaluation to determine whether the increase in delay is sufficient or not sufficient to cause a flow to rate adapt may be based on a delay increase measure for the path, a delay baseline for the monitored flow across the path, or both.

FIG. 8B illustrates operations that may be performed to detect increasing delay in a flow across a node, such as network device 120. At 822, an ingress time of a packet of a flow (or a packet of a set of flows) being monitored at network device 120 is determined. At 824, an egress time of the packet of the flow (or the packet of the set of flows) from network device 120 is determined. At 826, the current node delay period of the flow across network device 120 is calculated by taking the difference between the ingress time and the egress time. This may also be referred to as the queue delay period. At 828, a series of two or more node delay periods, which includes the current node delay period and one or more prior node delay periods, are evaluated to determine variation of the node delay, if any (i.e., baseline, increasing or decreasing).

If an increase in delay in the monitored flow is detected at 828, then at 830, the increase can be evaluated to determine whether the delay is sufficient or not sufficient to cause a delay-sensitive flow to rate adapt downward. If the evaluation of the series of node delay periods indicates that the increase in delay is sufficient to cause a delay-sensitive flow to rate adapt (i.e., decrease the flow rate), then the monitored flow can be further monitored to assess its behavior in response to the increasing delay. If the evaluation of the series of node delay periods indicates that the increase in delay not sufficient to cause a delay-sensitive flow to rate adapt, then the monitored flow may continue to be monitored for indications of greater increasing delay across the node. In at least one embodiment, the evaluation to determine whether the increase in delay is sufficient or not sufficient for a delay-sensitive flow to rate adapt may be based on a delay increase measure for the node, a delay baseline for the monitored flow across the node, or both.

As described above with reference to FIGS. 8A and 8B, increasing delay of a flow can be measured across either the path segment (described in FIG. 8A) or the network device (described in FIG. 8B). It will be apparent, however, that a delay increase of a flow can be determined across both the path segment and the network device by measuring the delay period (or transit period) of a packet from a source node sending the packet to an egress of the packet from network device 120. In this scenario, the delay period of a packet could be measured by the difference between a timestamp by a source node and a time of egress of the packet from the network device 120. As previously described herein, when a delay period is measured using a clock from a source node and a network device, there may be some differential representing the difference between the source node's clock and the network device's clock. The differential, however, should remain constant across all delay period measurements taken for the same flow. Thus, the evaluation of a series of such delay periods can indicate whether delay of the flow is increasing.

By way of illustration to show at least some potential advantages of embodiments disclosed herein, consider a video conferencing session between two or more users that includes 3 flows: 1) voice, which has low a bandwidth constant bit rate (CBR); 2) video, which has a high bandwidth variable bit rate (VBR); and 3) personal computer (PC) data, which has a highly bursty VBR. In a common configuration, if the presenter is in a steady state on a constrained last mile, the audio and video flows rate adapt to just below the line rate. When the PC bursts data to show a new slide, the last mile becomes congested and the voice and video have drops. In at least one embodiment of communication system 100, the PC data can be measured in intervals that are configured to capture the burstiness of the PC data. Therefore, the bursty PC data flow can be recognized as the cause of the bloat and can be appropriately classified as bloaty (e.g., delay-insensitive nice or naughty) and demoted if needed. For example, the PC data flow may be demoted to a delay-insensitive nice queue if it currently shares a delay-sensitive queue with the voice and video flows. The PC data flow can be demoted to a naughty queue if it currently shares a delay-insensitive nice queue with the voice and video flows. The voice flow can be classified as non-bloaty (e.g., delay-sensitive) and reassigned to a delay-sensitive queue, if it is currently assigned to another queue, such as a delay-insensitive nice queue or naughty queue. The video flow can be classified as either bloaty or non-bloaty, depending on particular characteristics of the video flow, and can be reassigned to an appropriate queue, if needed. Thus, the net effect is that the audio flow is not penalized by the PC data bursts and can also be protected from the video flow as well, if the video flow is bloaty. Additionally, the video flow is not penalized by the PC data bursts, if the video flow does not prove to be a naughty flow.

Note that, as used herein, unless expressly stated to the contrary, use of the phrase 'at least one of' refers to any combination of the named elements, conditions, or activities. For example, 'at least one of X, Y, and Z' is intended to mean any of the following: 1) one or more X's, but not Y and not Z; 2) one or more Y's, but not X and not Z; 3) one or more Z's, but not X and not Y; 4) one or more X's and one or more Y's, but not Z; 5) one or more X's and one or more Z's, but not Y; 6) one or more Y's and one or more Z's, but not X; or 7) one or more X's, one or more Y's, and one or more Z's.

In certain example implementations the delay precedence functions outlined herein may be implemented by logic encoded in one or more machine readable storage media (e.g., embedded logic provided in an application specific integrated circuit (ASIC), digital signal processor (DSP) instructions, software (potentially inclusive of object code and source code) to be executed by a processor or other similar machine, etc.). In some of these instances, a memory element (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, network device 120 may include software in order to achieve the delay precedence functions outlined herein. These activities can be facilitated by classification module 125, reclassification module 126, and delay monitoring module 128 (where the functionality of these modules can be suitably combined or separated in any appropriate manner, which may be based on particular configuration and/or provisioning needs). Network device 120 can include memory elements for storing information to be used in achieving the delay precedence activities, as discussed herein. Additionally, network device 120 may include one or more processors (e.g., processor 121) that can execute software or an algorithm to perform the delay precedence operations, as disclosed in this Specification. These devices may further keep information in any suitable memory elements (e.g., random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, cache, file, repository, etc.) should be construed as being encompassed within the broad term 'memory element.' Similarly, any of the potential processing elements, modules, and machines described in this Specification should be construed as being encompassed within the broad term 'processor.' Network device 120 can also include suitable interfaces (e.g., NIC 123) for receiving, transmitting, and/or otherwise communicating data or information in a network environment.

Note that with the example provided above, as well as numerous other examples provided herein, interaction may be described in terms of two, three, or four network elements and endpoints. However, this has been done for purposes of clarity and example only. In certain cases, it may be easier to describe one or more of the functionalities of a given set of operations by only referencing a limited number of network elements and endpoints. It should be appreciated that communication system 100 (and its teachings) are readily scalable and can accommodate a large number of components, as well as more complicated/sophisticated arrangements and configurations. In particular, a network such as network 105 may include any number of network devices, such as network device 120, both at the edge and/or within the core of network 105. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain queues (e.g., delay-sensitive, delay-insensitive nice, and naughty), communication system 100 may be applicable to other queue configurations, including a greater number of queues that provide various levels of granularity. Also, although the present disclosure has been described with reference to particular communication exchanges involving certain protocols (e.g., TCP), the present disclosure is applicable to numerous protocols, as this has only been offered for purposes of discussion and illustration.

Finally, it is also important to note that the operations in the preceding flowcharts illustrate only some of the possible scenarios and patterns that may be executed in association with addressing delay precedence in queues before a bottleneck link. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Communication system 100 may provide substantial flexibility in that any suitable arrangements, chronologies, configurations, and timing mechanisms may be provided without departing from the teachings of the present disclosure.

What is claimed is:

1. A method comprising:
   detecting an increase in delay of a flow assigned to a first queue of a network device;
   determining that the increase is sufficient to cause the flow to rate adapt downward if the flow is delay-sensitive, wherein the determining that the increase is sufficient includes evaluating a series of two or more delay periods of the flow, wherein a delay period includes at least a path delay of a packet of the flow measured from a source node of the flow to the network device;
   subsequent to the determining that the increase is sufficient, determining whether an amount of bandwidth consumed by the flow decreases sufficiently;
   assigning the flow to a second queue based, at least in part, on determining that the amount of bandwidth consumed by the flow does not decrease sufficiently in response to the increase in delay; and
   subsequent to assigning the flow to the second queue, assigning the flow to a third queue based, at least in part, on determining that a subsequent amount of bandwidth consumed by the flow does not decrease sufficiently in response to a packet loss in the flow, wherein only flows that do not rate adapt downward in response to packet losses are assigned to the third queue from another queue.

2. The method of claim 1, wherein the assigning the flow to the second queue causes subsequent packets of the flow to be stored in the second queue.

3. The method of claim 1, further comprising:
   evaluating a series of two or more bandwidth measurements of the flow according to a bandwidth reduction measure to determine whether the amount of bandwidth consumed by the flow decreases sufficiently.

4. The method of claim 3, wherein the two or more bandwidth measurements represent amounts of bandwidth consumed by the flow over sequential time periods.

5. The method of claim 1, wherein the flow comprises a set of flows having a same classification.

6. The method of claim 1, further comprising:
   determining that the two or more delay periods for, respectively, two or more packets of the flow received by the network device; and
   evaluating the two or more delay periods based, at least in part, on a delay increase measure to determine whether the increase is sufficient to cause the flow to rate adapt downward if the flow is delay-sensitive.

7. The method of claim 1, wherein the delay period is calculated based on either a time difference between an egress time of the packet at the network device and a timestamp added to the packet by the source node or a time difference between an ingress time of the packet at the network device and the timestamp added to the packet by the source node.

8. The method of claim 1, wherein delay-insensitive nice flows that are assigned to the second queue are not subsequently assigned to a different queue.

9. The method of claim 1, wherein only delay-sensitive flows are assigned to the first queue from a different queue.

10. The method of claim 1, further comprising:
    prior to detecting the increase in delay of the flow, assigning the flow to the first queue in response to the flow asserting itself as a delay-sensitive flow.

11. The method of claim 2, wherein the subsequent packets of the flow are not stored in the second queue until after a propagation delay period of the flow expires, wherein a timer for the propagation delay period begins when the increase is determined to be sufficient to cause the flow to rate adapt downward if the flow is delay-sensitive.

12. At least one non-transitory machine readable storage medium having instructions stored therein, and when executed by at least one processor the instructions cause the at least one processor to:
    detect an increase in delay of a flow assigned to a first queue of a network device;
    determine that the increase is sufficient to cause the flow to rate adapt downward if the flow is delay-sensitive, wherein determining that the increase is sufficient includes evaluating a series of two or more delay periods of the flow, wherein a delay period includes at least a path delay of a packet of the flow measured from a source node of the flow to the network device;

subsequent to the determining that the increase is sufficient, determine whether an amount of bandwidth consumed by the flow decreases sufficiently;

assign the flow to a second queue based, at least in part, on determining that the amount of bandwidth consumed by the flow does not decrease sufficiently in response to the increase in delay; and subsequent to the flow being assigned to the second queue, assign the flow to a third queue based, at least in part, on determining that a subsequent amount of bandwidth consumed by the flow does not decrease sufficiently in response to a packet loss in the flow, wherein only flows that do not rate adapt downward in response to packet losses are assigned to the third queue from another queue.

13. The at least one non-transitory machine readable storage medium of claim 12, wherein the instructions when executed by the at least one processor cause the at least one processor to:

evaluate a series of two or more bandwidth measurements of the flow according to a bandwidth reduction measure to determine whether the amount of bandwidth consumed by the flow is decreases sufficiently.

14. The at least one non-transitory machine readable storage medium of claim 13, wherein the two or more bandwidth measurements represent amounts of bandwidth consumed by the flow over sequential time periods.

15. The at least one non-transitory machine readable storage medium of claim 12, wherein the instructions when executed by the at least one processor cause the at least one processor to:

determine that the two or more delay periods for, respectively, two or more packets of the flow received by the network device; and evaluate the two or more delay periods based, at least in part, on a delay increase measure to determine whether the increase is sufficient to cause the flow to rate adapt downward if the flow is delay-sensitive.

16. The at least one non-transitory machine readable storage medium of claim 12, wherein the delay period is calculated based on either a time difference between an egress time of the packet at the network device and a timestamp added to the packet by the source node or a time difference between an ingress time of the packet at the network device and the timestamp added to the packet by the source node.

17. An apparatus comprising:
at least one processor; and
at least one memory element comprising instructions that when executed by the at least one processor cause the apparatus to:

detect an increase in delay of a flow assigned to a first queue of a network device;

determine that the increase is sufficient to cause the flow to rate adapt downward if the flow is delay-sensitive, wherein determining that the increase is sufficient includes evaluating a series of two or more delay periods of the flow, wherein a delay period includes at least a path delay of a packet of the flow measured from a source node of the flow to the network device;

subsequent to the determining that the increase is sufficient, determine whether an amount of bandwidth consumed by the flow decreases sufficiently;

assign the flow to a second queue based, at least in part, on determining that the amount of bandwidth consumed by the flow does not decrease sufficiently in response to the increase in delay; and subsequent to the flow being assigned to the second queue, assign the flow to a third queue based, at least in part, on determining that a subsequent amount of bandwidth consumed by the flow does not decrease sufficiently in response to a packet loss in the flow, wherein only flows that do not rate adapt downward in response to packet losses are assigned to the third queue from another queue.

18. The apparatus of claim 17, wherein the instructions when executed by the at least one processor cause the apparatus to:

evaluate a series of two or more bandwidth measurements of the flow according to a bandwidth reduction measure to determine whether the amount of bandwidth consumed by the flow is decreases sufficiently.

19. The apparatus of claim 17, wherein the instructions when executed by the at least one processor cause the apparatus to:

prior to detecting the increase in delay of the flow, assign the flow to the first queue in response to the flow asserting itself as a delay-sensitive flow.

20. The apparatus of claim 17, wherein the flow comprises a set of flows having a same classification.

* * * * *